United States Patent
Passey et al.

(10) Patent No.: US 11,675,864 B2
(45) Date of Patent: Jun. 13, 2023

(54) PROXY LINKS TO SUPPORT LEGACY LINKS

(71) Applicant: Dropbox, Inc., San Francisco, CA (US)

(72) Inventors: Aaron Passey, San Rafael, CA (US); Fangzhou Wang, San Francisco, CA (US); Eric Cunningham, San Francisco, CA (US); Royce Ausburn, Mountain View, CA (US); Nicholas Larson, Bagley, MN (US); David Wetterau, San Francisco, CA (US); William Ho, Cupertino, CA (US); Harrison Ho, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/360,556

(22) Filed: Jun. 28, 2021

(65) Prior Publication Data
US 2022/0414176 A1    Dec. 29, 2022

(51) Int. Cl.
G06F 17/00     (2019.01)
G06F 16/955    (2019.01)
G06F 16/176    (2019.01)
G06F 21/62     (2013.01)

(52) U.S. Cl.
CPC ........ *G06F 16/9558* (2019.01); *G06F 16/176* (2019.01); *G06F 16/9566* (2019.01); *G06F 21/6209* (2013.01)

(58) Field of Classification Search
None
See application file for complete search history.

(56) References Cited

U.S. PATENT DOCUMENTS

| 7,243,226 | B2 | 7/2007 | Newcombe et al. |
| 7,904,949 | B2 | 3/2011 | Bowers et al. |
| 8,606,684 | B2 | 12/2013 | Bl et al. |
| 9,172,694 | B2 | 10/2015 | Canning et al. |

(Continued)

FOREIGN PATENT DOCUMENTS

| WO | 2014076442 A1 | 5/2014 |
| WO | 2020222009 A1 | 11/2020 |

OTHER PUBLICATIONS

"AIOSEO Documentation", pp. 1-4, dated: Apr. 19, 2021, URL<https://web.archive.org/web/20210419030440/https://aioseo.com/docs/how-to-redirect-multiple-urls-to-the-same-destination/> (Year: 2021).*

(Continued)

*Primary Examiner* — Mustafa A Amin
(74) *Attorney, Agent, or Firm* — Polsinelli PC

(57) ABSTRACT

The present technology pertains to a link service that can create, maintain, and service links to objects on behalf of a content management system or other services. The link service can share administration of links with other services when desired or can even allow other services to issue the link and manage the object that is the subject of the link while providing other functions to support the link. Additionally, link service can interface with a file system that can support links as actors in the file system, whereby greater control and flexibility in supporting links is provided. Link service can also accommodate servicing and management of links issued by legacy services, where the legacy services have unique link logic that should still be utilized to maintain a consistent user experience.

20 Claims, 18 Drawing Sheets

(56) References Cited

U.S. PATENT DOCUMENTS

| | | | |
|---|---|---|---|
| 9,553,758 B2 | 1/2017 | Rexer | |
| 10,149,156 B1 | 12/2018 | Tiku et al. | |
| 10,162,980 B1 | 12/2018 | Bernotavicius et al. | |
| 2002/0083178 A1* | 6/2002 | Brothers | H04L 63/10 709/218 |
| 2002/0116454 A1 | 8/2002 | Dyla et al. | |
| 2004/0006710 A1 | 1/2004 | Pollutro et al. | |
| 2004/0015501 A1 | 1/2004 | Anonsen et al. | |
| 2005/0071477 A1 | 3/2005 | Evans et al. | |
| 2010/0031367 A1 | 2/2010 | Leonard et al. | |
| 2012/0150989 A1 | 6/2012 | Portnoy et al. | |
| 2013/0066975 A1 | 3/2013 | Kantor et al. | |
| 2014/0137184 A1 | 5/2014 | Russello et al. | |
| 2015/0019480 A1 | 1/2015 | Maquaire et al. | |
| 2015/0019559 A1 | 1/2015 | Maquaire et al. | |
| 2015/0143503 A1 | 5/2015 | Micucci et al. | |
| 2015/0326948 A1* | 11/2015 | Des Jardins | G06F 16/435 725/32 |
| 2015/0350186 A1 | 12/2015 | Chan et al. | |
| 2017/0264640 A1 | 9/2017 | Narayanaswamy et al. | |
| 2017/0289338 A1 | 10/2017 | Riva et al. | |
| 2018/0191718 A1 | 7/2018 | Kuzkin et al. | |
| 2019/0005062 A1 | 1/2019 | Joneja | |
| 2019/0278924 A1 | 9/2019 | Zhang et al. | |
| 2020/0412708 A1 | 12/2020 | Oberoi et al. | |
| 2021/0165759 A1 | 6/2021 | Bar-Nissan et al. | |
| 2022/0337595 A1 | 10/2022 | Malik | |

OTHER PUBLICATIONS

International Search Report and Written Opinion for Application No. PCT/US2022/015421, dated May 27, 2022, 9 pages.

International Search Report and Written Opinion for Application No. PCT/US2022/015422, dated May 27, 2022, 10 pages.

Non-Final Office Action from U.S. Appl. No. 17/360,549, dated Jul. 6, 2022, 16 pages.

Notice of Allowance from U.S. Appl. No. 17/360,549, dated Jan. 12, 2023, 11 pages.

Non-Final Office Action from U.S. Appl. No. 17/360,400, dated Mar. 31, 2023, 13 pages.

* cited by examiner

| API | Function |
|---|---|
| GetFileLinkActions | Receives user sID and object oID --> returns UI to create links or list existing when has permission oID the link |
| CreateApplicationLink | Receives user sID, object oID, and link type (external link, legacy settings) --> creates |
| ListLinks | Receives user sID, object oID, and link type --> list all links sID is permitted to fetch |
| GetLinkMetadata | Receives user sID, Link ID--> list of metadata to link (Link ID, shareable URL, Type, oID, settings, action permitted by link, etc. |
| ModifyLink | Receives user sID, Link ID, link type --> updates metadata |
| DeleteLink | Receives user sID, Link ID, link type --> deletes link |
| GetLinkVisitorAccess | Receives the URL or token, visitor sID (or anonymous), password (if configured) --> determines in access is permitted and performs rate limiting logging returns Link type, ID, Access determination yes, what access, if no, reason) |
| VisitLink | Receives the URL or token, visitor sID (or anonymous), password (if configured) --> determines in access is permitted and performs rate limiting logging returns file system Auth token for to object a temporary that provides object |
| GetFile | Receives token (Auth token, or temp token) and oID --> fetches object from file system |
| ListFolder | Receives token (Auth token, or temp token) and oID --> retruns folder from file system |
| Upload | Receives token (Auth token, or temp token), oID, subpath, and object data --> when permitted, stores the object |

FIG. 9

PROXY LINKS TO SUPPORT LEGACY LINKS

TECHNICAL FIELD

The present technology pertains to links to objects in a content management system, and more particularly pertains to identifying a link as an actor in a file system, whereby an access control list can be used to regulate access to the object.

BACKGROUND

It is common to share links that can provide access to objects in a content management system. However, the links are often not tightly coupled to the file system of the content management system such that the access provided by the links may not be consistent with the access control logic that is utilized by the file system. Often, it is necessary for content management systems to utilize additional logic to determine if a link is valid, if a link caller is a proper link holder, and to boot-strap access permissions to the object in the file system for the link caller. Most file systems rely on a subject that is an actor in a file system, and a statement of rights. For example, a user can have read/write access. But in the case of a link, where the link caller is not known to the file system, whom should the file system identify as an actor to determine whether access is permitted, or what type of access should be allowed? Such issues create much complexity and limit the flexibility and functionality of link sharing by a content management system.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 9 illustrates some example APIs and their functions in accordance with some aspects of the present technology;

DETAILED DESCRIPTION

Figure 1:
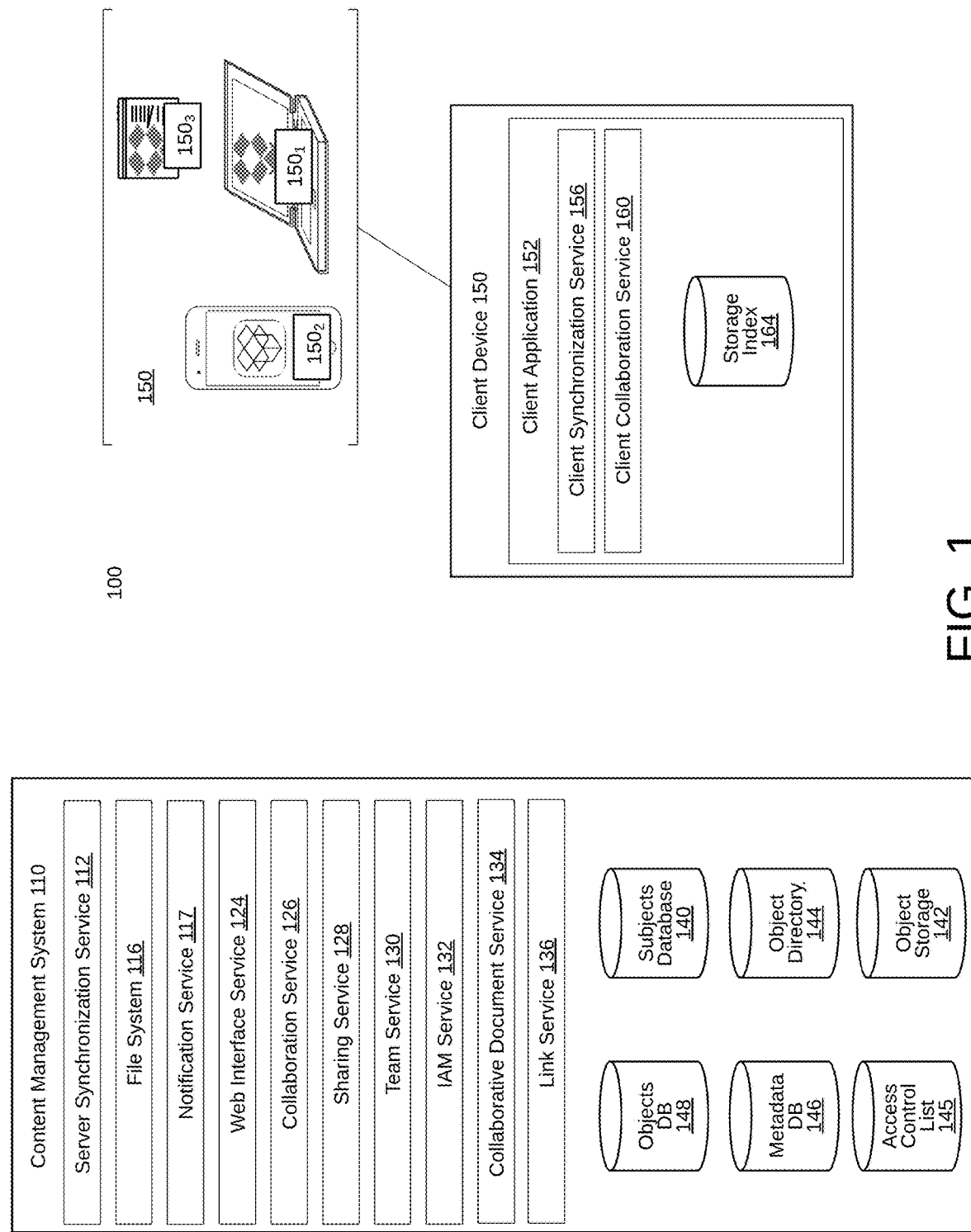
FIG. 1 illustrates an example of a content management system and client devices in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Most content management systems are optimized for a particular usage model and are poorly suited to any other mechanism of usage. This worked fine for content management systems that were deployed in a specific instance on an enterprise level but are not suitable for modern cloud-based content management systems.

One example illustrating how modern content management systems require more flexibility is link sharing. It is common to share links that can provide access to objects in a content management system. However, the links are often not tightly coupled to the file system of the content management system such that the access provided by the links may not be consistent with the access control logic that is utilized by the file system. Often it is necessary for content management systems to utilize additional logic to determine if a link is valid if a link caller is a proper link holder, and to boot-strap access permissions to the object in the file system for the link caller. Most file systems rely on a subject that is an actor in a file system, and a statement of rights recorded in an access control list. For example, a user can have read/write access. But in the case of a link, where the link caller is not known to the file system, who should the file system identify as an actor to determine whether access is permitted, or what type of access should be allowed? Such issues create much complexity and limit the flexibility and functionality of link sharing by a content management system. For example, such a scenario can result in a user being granted access to an object even though they are not permitted to have access to the object in the access control list in the file system. Such a behavior is not desirable, but it is necessary to enable link sharing functionality.

The disclosed technology addresses the need in the art for improved object access when an object is requested via a link by a link caller. Specifically, the present technology can identify a link as a known subject in the file system itself. As such, a link can be an actor given rights in an access control list. This provides a number of benefits. A primary benefit is that the file system can directly determine access to a requested object utilizing its regular access control list (ACL) evaluation. Whether the object is requested by an anonymous link caller through a link or directly through a registered user account of the content management system that has access permissions in the access control list, the file system can evaluate access to the object in the same way.

The present technology can efficiently check access at read time. When an object is requested by any client of the content management system, the content management system can efficiently determine if there have been any changes in access. And when it is determined that a change in access has occurred, the content management system can determine new access privileges (or loss thereof).

The present technology also provides for a more flexible access permission model. Access permissions for an object can apply to a whole directory, can apply only to a particular object, can be inherited from a global policy, can be inherited from a direct ancestor, can suppress permissions that would otherwise be inherited, can provide policies that are not able to be suppressed, etc. Any combination of the above policies can be aggregated to make up an access control list for a particular object in a given directory tree. Accordingly, the present technology can accommodate just about any customized collection of access policies.

Since access is always checked at read time, and access can be evaluated at an object level, access associated with a link can be modified at any time by adjusting the access control list associated with the object and the link.

In addition, the present technology eliminates the need for a conventional user account of the content management system to provide links to objects. Other services or TOT devices may wish to send a link. Accordingly, the present technology includes a link service. The link service can be offered in a software-as-a-service model, where entities (user accounts, services, devices, etc.) can create links to objects in the file system. The link service can perform a variety of functions in addition to establishing the link in the file system. For example, the link service can also perform logging, abuse prevention, blocking, etc. The link service can also implement or enforce additional link polices beyond the access policies enforced by the file system. The link service can be implemented as a service provided by a content management system, or a separate platform that interfaces with a content management system.

Further, the present technology can accommodate existing links. While these existing links might utilize the aforementioned additional logic to support such links, it is desired that legacy links remain valid links. Accordingly, the link service of the present technology can also interface with existing link logic while still allowing a file system to evaluate access via the link as an actor within the file system.

Additionally, the additional services that might wish to utilize the link service might wish to provide a user experience that gives the additional services more control over the link and the use thereof. In other words, the additional services might not wish to fully hand over link handling to the link service. The present technology can also handle such use cases by providing for co-management of a link by the additional services and the link service of the present technology. In this way, the additional services can maintain control where they desire, and outsource the rest of link handling to the link service.

These and other benefits over the prior art are described herein.

In some embodiments, the disclosed technology is deployed in the context of a content management system having object synchronization capabilities and collaboration features, among others. An example system configuration 100 is shown in FIG. 1, which depicts content management system 110 interacting with client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, third-party service, link service, device, etc.) can create an account with content management system, and account details can be stored in subjects database 140. Subjects database 140 can identify a registered subject by a subject ID, and store profile information for registered subjects in association with the subject ID. In some cases, profile information for registered subjects includes a subject name and/or email address. Subjects database 140 can include account management information, such as account type (e.g. various tiers of free or paid accounts), storage space allocated, storage space used, client devices 150 having a registered content management client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subjects database 140 need not store complete information associated with an account for a subject. Some portion of information associated with an account for a subject can also be stored in another database of content management system 110 such as metadata database 146, or in a database external to content management system 110.

Subjects database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subjects database 140 can be broken into a plurality of tables, indexes and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 110 or in other content management systems, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in object directory 144. Additionally, data regarding changes, access, etc. can be stored in objects database 148. Objects database 148 can also include a subject account identifier that identifies the subject IDs that have access to the object.

In some embodiments, objects database 148 can be broken into a plurality of tables, indexes and other data structures.

Each of the various storages/databases such as object storage 142, object directory 144, objects database 148, and metadata database 146 can be comprised of more than one such storage or database and can be distributed over many devices and locations. Other configurations are also possible. For example, data from object storage 142, object directory 144, objects database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one file system 116, which includes software or other processor executable instructions for managing the storage of objects including, but not limited to, receiving objects for storage, preparing objects for storage, selecting a storage location for the object, retrieving objects from storage, etc. In some embodiments, file system 116 can divide an object into smaller chunks for storage at object storage 142. The location of each chunk making up an object can be recorded in object directory 144. Object directory 144 can include a content entry for each object stored in object storage 142. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, file system 116 can output a unique hash for each different version of an object.

File system 116 can also designate or record a parent of an object or a content path for an object in objects database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 142 in blocks and may not be stored under a tree like directory structure, such directory structure is a comfortable navigation structure for subjects viewing objects. File system 116 can define or record a content path for an object wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. As addressed above, the directory structure is merely a comfortable navigation structure for subjects viewing objects, but it does not correlate to storage locations of objects in object storage 142.

While the directory structure in which an account views objects does not correlate to storage locations of the objects at content management system 110, the directory structure can correlate to storage locations of the objects on client device 150 depending on the file system used by client device 150.

As addressed above, a content entry in object directory 144 can also include the location of each chunk making up an object. More specifically, the content entry can include content pointers that identify the location in object storage 142 of the chunks that make up the object.

File system 116 can decrease the amount of storage space required by identifying duplicate objects or duplicate blocks that make up an object or versions of an object. Instead of storing multiple copies, object storage 142 can store a single copy of the object or block of the object, and object directory 144 can include a pointer or other mechanism to link the duplicates to the single copy.

File system 116 can also store metadata describing objects, object types, folders, file path, and/or the relationship of objects to various accounts, collections, or groups in metadata database 146, in association with the object ID of the object.

File system 116 can also store a log of data regarding changes, access, etc. in objects database 148. Objects database 148 can include the object ID of the object and can optionally include a description of the change or access action along with a time stamp or version number and any other relevant data. Objects database 148 can also include pointers to blocks affected by the change or object access. File system 116 can also provide the ability to undo operations, by using an object version control mechanism that tracks changes to objects, different versions of objects (including diverging version trees), and a change history that can be acquired from objects database 148.

Object Synchronization

Another feature of content management system 110 is synchronization of objects with at least one client device 150. Client device(s) 150 can take different forms and have different capabilities. For example, client device $150_1$ is a computing device having a local file system accessible by multiple applications resident thereon. Client device $150_2$ is a computing device wherein objects are only accessible to a specific application or by permission given by the specific application, and the objects are typically stored either in an application specific space or in the cloud. Client device $150_3$ is any client device accessing content management system 110 via a web browser and accessing objects via a web interface. While example client devices $150_1$, $150_2$, and $150_3$ are depicted in form factors such as a laptop, mobile device, or web browser, it should be understood that the descriptions thereof are not limited to devices of these example form factors. For example, a mobile device such as client $150_2$ might have a local file system accessible by multiple applications resident thereon, or client 150₂ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices 150 are associated with an account of content management system 110, but In some embodiments, client devices 150 can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (e.g., new, deleted, modified, copied, or moved objects) to objects in a designated location of a file system of client device 150.

Objects can be synchronized from client device 150 to content management system 110, and vice versa. In embodiments wherein synchronization is from client device 150 to content management system 110, a subject can manipulate objects directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the object into blocks, hashing the object to generate a unique identifier, etc. Client synchronization service 156 can index content within client storage index 164 and save the result in client storage index 164. Indexing can include storing paths plus the object identifier, and a unique identifier for each object. In some embodiments, client synchronization service 156 learns the object identifier from server synchronization service 112, and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. File system 116 can store the changed or new block for the object and update objects database 148, metadata database 146, object directory 144, object storage 142, subjects database 140, etc. as appropriate.

When synchronizing from content management system 110 to client device 150, data regarding a mount, modification, addition, deletion, move of an object recorded in objects database 148 can trigger a notification to be sent to client device 150 using notification service 117. When client device 150 is informed of the change, client device 150 can make a request for changes listed in objects database 148 since the last synchronization point known to the client device. When client device 150 determines that it is out of synchronization with content management system 110, client synchronization service 156 requests object blocks including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remainder portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

While the synchronization embodiments addressed above referred to client device 150 and a server of content management system 110, it should be appreciated by those of ordinary skill in the art that a user account can have any number of client devices 150 all synchronizing objects with content management system 110, such that changes to an object on any one client device 150 can propagate to other client devices 150 through their respective synchronization with content management system 110.

Collaboration Features

Another feature of content management system 110 is to facilitate collaboration between subjects. Collaboration features include object sharing, commenting on objects, co-working on objects in real time, instant messaging, providing presence and "seen" state information regarding objects, etc.

Sharing

Content management system 110 can manage sharing objects via sharing service 128 or link service 136. Sharing content by sharing service can include linking content using sharing service 128 to share content within content management system 110 with at least one additional subject account (in addition to the original subject account associated with the object) so that each subject account has access to the object within their respective accounts. The additional subject account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of subject accounts.

To share an object within content management system 110 sharing service 128 can associate a subject ID of a team or of one or more subject accounts with an object in objects database 148 associated with the object, thus granting the added subject account(s) access to the object. Sharing service 128 can also remove subject IDs from being permitted to access an object in objects database 148 to restrict a subject account's access to the object. Sharing service 128 can record object identifiers, subject identifiers given access to an object, and access levels in objects database 148. For example, in some embodiments, subject identifiers associated with a single object can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed. In some embodiments, objects can inherit access rights from another object such as ancestor objects.

Objects can also be shared so that they are accessible by a link. Link service 136 is a software-as-a-service platform that can create links to objects, handle management of links, and perform link related functions such as logging, abuse prevention, integration with third-party services, and other functions as will be described in further detail herein.

To share objects outside of content management system 110, link service 136 can generate a custom network address, such as a uniform resource locator (URL), which allows any web browser to access the object or collection in content management system 110. Link service 136 can include content identification data in the generated URL, which can later be used to properly identify and return the requested object. For example, link service 136 can receive a request to access an object identified in a link, and can perform link related functions, and communicate with file system 116 to evaluate access permissions associated with the link. Once access is determined, link service 116 can return a file system access token in a message identifying an object ID and optionally a subject ID which can be used by the link caller to retrieve the object from file system 116.

In addition to generating the URL, link service 136 can also be configured to record, in objects database 148, that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object. Sharing service 136 can also create a new subject ID identifying the link in subjects database 140. This action makes the link an actor within the file system 116. As used herein, a subject ID for a link can be referred to as a Link_sID.

In some embodiments, sharing service 128 can associate a set of permissions to a Link_sID relative to an object. For example, if object is accessed via the URL, sharing service 128 can provide a limited set of permissions for the object based on the permissions associated with respect to the Link_sID for that object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, link service 136 can also be configured to deactivate a generated URL. For example, each entry into objects database 148 can also include a URL active flag indicating whether the content should be returned in response to a request from the generated URL. For example, link service 136 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL. Access to an object can also be modified by modifying a permissions statement associated with the Link_sID for the object. This can also occur after a link has been distributed.

In some embodiments, content management system 110 can designate a URL for uploading an object. For example, a first subject with a subject account can request such a URL, provide the URL to a contributing subject and the contributing subject can upload an object to the first subject's subject account using the URL.

While link service 136 is illustrated as being a service offered as part of content management system 110, link service 136 can be a separate service.

Team Service

In some embodiments, content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Teams service 130 can provide a common shared space for the team, private subject account folders, and access limited shared folders. Teams service 130 can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 can authenticate a subject account. For subject accounts with multiple levels of rights (e.g. a subject account with subject rights and administrator rights) IAM service 132 can also facilitate explicit privilege escalation to avoid unintentional actions by administrators.

Object Access

File system 116 can receive a token from client application 152 that follows a request to access an object and can return the capabilities permitted to the subject account. While File system 116 is illustrated as a separate entity from object storage 142, references to file system 116 can refer to file system 116 performing operations on object storage 142. For example, a reference to subject making a request for an object from file system 116 refers to file system 116 performing operations to determine whether access is permitted and retrieving objects from object storage 142. Thus references to file system 116 can be a proxy for referring to the collective file system 116 and object storage 142.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notifications service 117 when client device 150 is accessing the object. Notifications service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject letting them know that they have been mentioned in the comment. Various other object events can trigger notifications, including deleting an object, sharing an object, etc.

Collaboration service 126 can also provide a messaging platform whereby subjects can send and receive instant messages, voice calls, emails, etc.

Collaboration Objects

In some embodiments, content management service can also include collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments, this can be managed by requiring two subjects access an object through a web interface and there they can work on the same copy of the object at the same time.

Collaboration Companion Interface

In some embodiments, client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by content application 152, the native application may not provide any native way to display the above addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the subject can also interact with content management system 110 via a third-party application, such as a web browser, that resides on client device 150 and is configured to communicate with content management system 110. In various implementations, the client-side application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third-Party Services

In some embodiments, content management system 110 can include functionality to interface with one or more third-party services such as workspace services, email services, task services, etc. In such embodiments, content management system 110 can be provided with login credentials for a subject account at the third-party service to interact with the third-party service to bring functionality or data from those third-party services into various subject interfaces provided by content management system 110.

In some embodiments, third-party services can also interact with content management system 110 through link service 136, wherein the third-party service can request links to be created on its behalf by link service 136.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
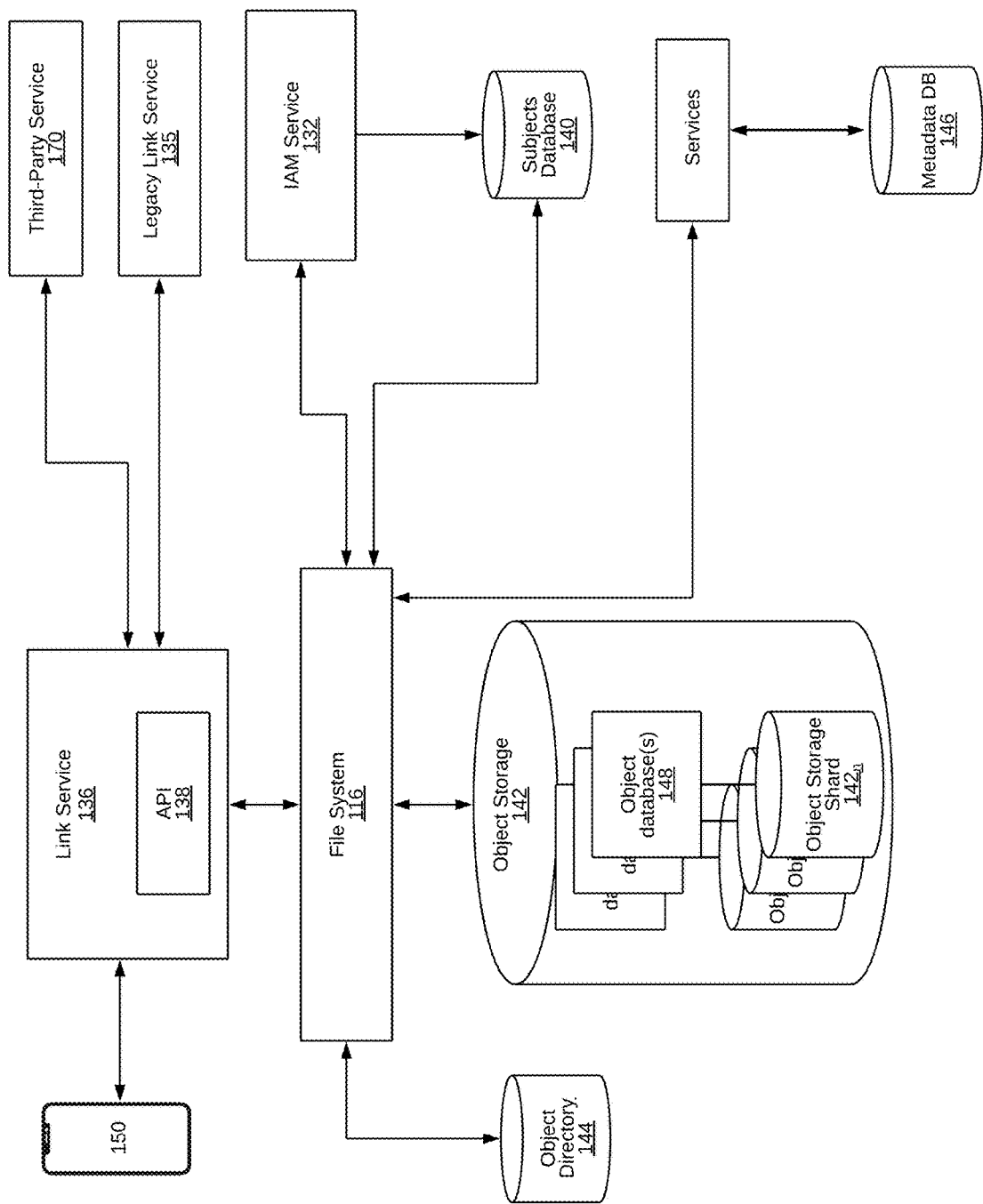
FIG. 2 illustrates additional details of the content management system including a link service in accordance with some aspects of the present technology.

FIG. 2 illustrates additional details of content management system 110, in accordance with some embodiments. For example, FIG. 2 illustrates file system 116 which, as described above, is configured to determine where objects are stored in object storage 142, among other functions.

Object storage 142 is illustrated as being divided amongst a plurality of object storage shards 142*n* and associated with each shard is a portion of objects database 148. Objects are distributed across various of the object storage shards 142*n*, and data associated with the object on a particular object storage shard 142*n* is stored in the portion of objects database 148 that is also stored on the same shard. To facilitate this distribution of object storage database 142 across a plurality of shards, file system 116 can direct data to be written into objects database 148 to the appropriate portion of the object database on the appropriate shard. Furthermore, when an object is moved from one object storage shard 142*n* to another object storage shard 142*n*, file system 116 is responsible for both migrating the object across shards and for migrating data in objects database 148 pertaining to that object to the new object storage shard 142*n*.

FIG. 2 also illustrates IAM service 132 in communication with file system 116 and subjects database 140. As will be addressed further herein, IAM service 132 can interact with file system 116 and objects database 148 to determine access information pertaining to objects. IAM service 132 can also interact with subjects database 140 to perform identity and access services.

FIG. 2 also illustrates, generically, services which represent any one of services discussed with respect to FIG. 1 or other services that may need to interact with or otherwise be a client of file system 116, objects database 148, or metadata database 146 to perform one or more functions described further herein.

FIG. 2 also illustrates link service 136 having one or more APIs 138 that provide interfaces that can be called by client device 150, file system 116, third-party services 170 and legacy link services 135 to take advantage of various functions performed by link service 136.

Link service 136 is a software-as-a-service platform that can handle creation of links to objects and provides a variety of link services. The most basic function of link service 136 is to receive requests through API 138 to create and issue a link. Upon receiving such a request, link service 136 can create and/or map a URL to an object and/or an entity with metadata about the URL. In some embodiments, link service 136 can also handle creation and enforcement of link settings such as link expirations, password, audience. Link service 136 can also control who can create links to some objects and prevent link creation for non-verified users. Link service 136 can ensure that any link conforms to other sharing or access policies associated with an object.

Another critical function of link service 136 is to receive requests through API 138 to access an object of metadata that is mapped by a URL called by a link caller. Receiving such requests includes more than the basic validating of a link and serving the requested content. Link service 136 can also perform functions related to rate limiting (limiting how often or quickly a link can be called), abuse prevention, banning of links, analytics, metrics and logging, link sender and visitor tracking, audit logging. Link service 136 can also provide an administrator interface to manage links.

In some embodiments, link service 136 utilizes logic of file system 116 to determine whether a link caller has access to an object to which a link refers. For example, link service 136 can utilize file system 116 to determine whether a link caller should be able to access an object to which a link refers. As will be addressed herein, link service can establish the link as an actor (i.e., a subject ID, sID, or specifically when referring to a link, a link_sID) within the file system 116, where the link_sID is associated with specified permissions in a permission statement.

In some embodiments, link service 136 utilizes logic external to a file system to determine whether a link caller has access to an object to which a link refers, link service 136 can utilize third-party service 170 to determine whether a link caller should be able to access the object. A third-party service in the context of this example might be a service that generates content but utilizes link service to share the content. Third-party service 170 might also use content management system 110 to store content generated on the third-party service 170. A third-party service 170 in the context of this example might also be a service that does not create objects, but instead offers services, such as the signing of documents, video conferences, workflows, etc. to which objects are relevant. Utilizing third-party service 170 to determine whether a link caller should be able to access the object is particularly useful when a third-party service utilizes link service 136 to issue a link, but third-party service 170 desires to share some management of the link. This example is also useful when third-party service 170 issued the link, but desires to utilize link service 136 to manage the link.

In another example of utilizing logic external to the file system to determine whether a link caller has access to an object to which a link refers, link service 136 can utilize legacy link service 135 to determine whether a link caller should be able to access the object. This example is particularly useful when an issued link utilizes access logic different than the access logic provided by link service 136. In this way, legacy links can continue to provide a user experience that a link caller expects, while link service 136 can take over management and maintenance of the link.

In some embodiments, link service 136 can utilize logic of file system 116 together with logic provided by third-party service 170 or legacy link service 135 to support some links.

Figure 3:
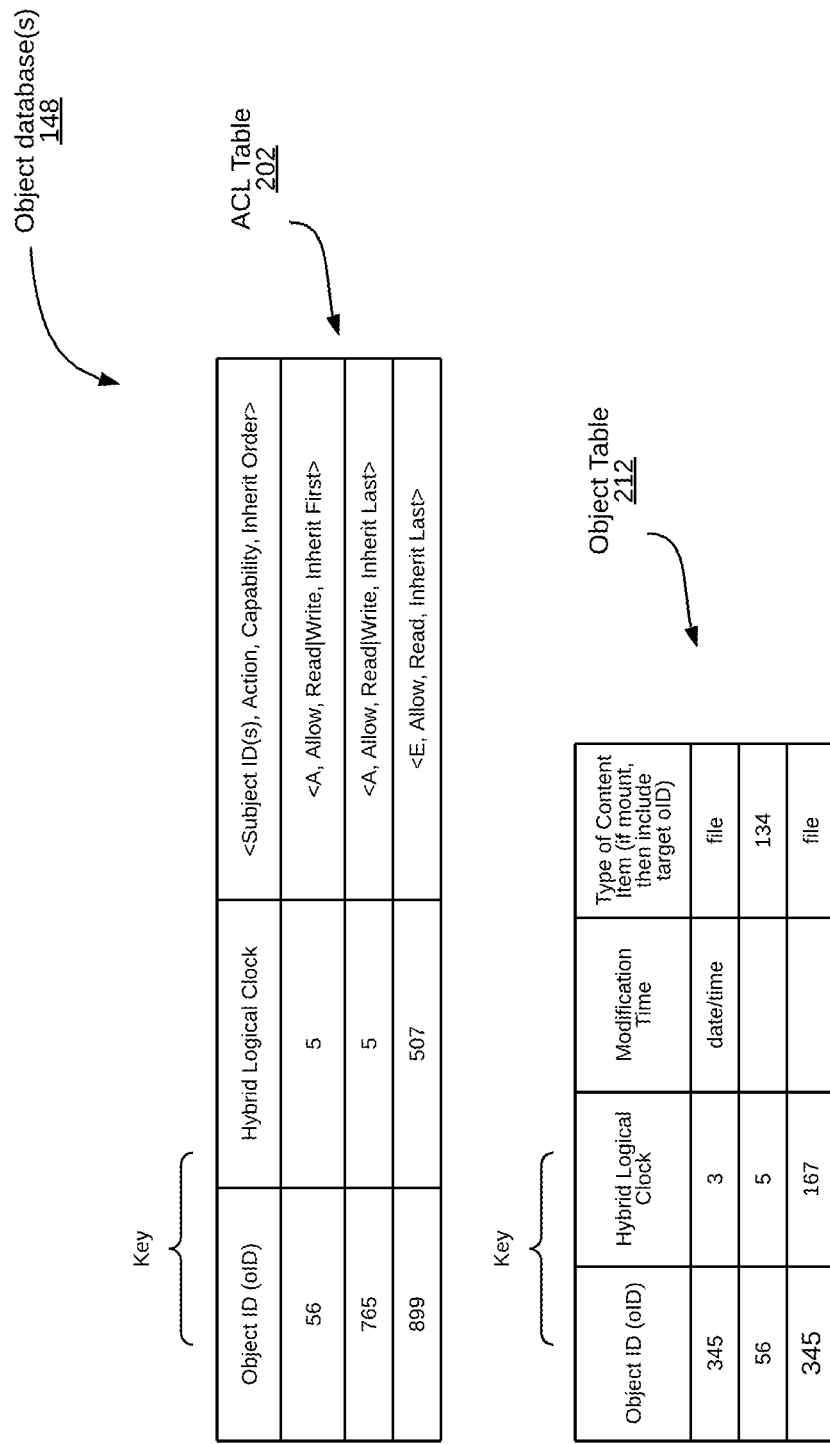
FIG. 3 illustrates an example of an object database in accordance with some aspects of the present technology.

FIG. 3 illustrates an example of objects database 148, in accordance with some embodiments. Objects database 148 can be made up of a collection of tables and indexes, however, FIG. 3 illustrates access control list (ACL) table 202 and object table 212.

The tables objects database 148 are all key-value stores, however, the present technology should not be limited to such data structures. All the tables in objects database 148 refer to an object ID (oID) and a hybrid logical clock (HLC). In the tables in objects database 148, oID and HLC make up the key for performing lookups in the various tables in objects database 148.

The oID is an ID for an object. An object generally is any entity that can be recorded in the file system. The hybrid logical clock (HLC) is a clock value that combines aspects of a time clock and a logical clock. HLC guarantees that all events on a particular machine will be recorded in the order that they happen and also that all events after a transmission on a receiving machine will be ordered after the events before the transmission on the sending machine.

As introduced, objects database 148 can be made up of several tables. ACL table 202 is optimized to record all changes in permissions (including access) pertaining to an object. In some embodiments, permissions are expressed in terms of a tuple of subject, action, capability, and inheritance, and these are all recorded in ACL table 202. While reference to a tuple is used throughout this description, persons of ordinary skill in the art will appreciate that any mechanism to represent a collection of values can be used.

A subject (identified by a subject ID (sID)) pertains to any actor in the content management system. In the case of a link, the subject ID may be referred to as a link_sID. An actor can be a subject account for an individual, a team or group that maps to accounts of individuals, an organization that maps to teams, a group of groups, a link, a device, an organization, third-party service 170, or any entity, etc. In some embodiments, more than one subject ID can be listed in a permissions statement.

An action defines whether a subject is allowed or not allowed to perform a capability and can be conditional on other factors. The table below describes some example actions.

| Action | Description |
| --- | --- |
| Allow | Allow the capability if the subject is in sID |
| Deny | Deny the capability if the subject is in sID |
| Allow_If_Not | Allow the capability if the subject is NOT in sID |
| Deny_If_Not | Deny the capability if the subject is NOT in sID |
| Allow_Inherit | Allow inheritance of the capability if the subject is in sID |
| Deny_Inherit | Deny inheritance of the capability if the subject is in sID |
| Allow_Inherit_If_Not | Allow inheritance of the capability if the subject is NOT in sID |
| Deny_Inherit_If_Not | Deny inheritance of the capability if the subject is NOT in sID |

Collectively these actions provide for the ability to create highly customized permission statements. As noted above, the present technology provides an improvement over the state of the art by supporting a wide array of potential permissions, and by accounting for a wide variety of permission organization schemes in a highly efficient system. Some entity accounts might be governed by general-purpose top-level rules, but for which exceptions might sometimes be necessary. For example, an organization account might allow the sharing of objects by team members as long as the sharing is within the organization. This policy would be a top-level policy that applies to every object in the organization's account. But it might be the case that an exception needs to be made, and the actions above would allow such an exception.

Some actions also refer to an inheritance. ACL table 202 also includes a column regarding inheritance order, which refers to whether the object should inherit permissions from another object. Most content management systems follow an inherit last scheme where, in a tree directory structure, every node inherits permissions from its immediate ancestor. However, the present technology can support inheritance from either the top of a directory structure, or from the direct ancestor (inherit last), or to not inherit permissions at all. The combination of these inheritance schemes also contributes to the highly customized permissions possible for any object. It is possible to have all objects comply with an inherit-first permissions statement, which can be thought of as a top-level policy that applies to all objects below it in a directory tree, while also having inheritance for some properties coming from its immediate ancestor. It is also possible, that a specific object could inherit none of the inherit-first or inherit-last permissions statements. In some instances, it is possible that a subject could have access to an object without having access to any ancestor or child objects in a directory structure.

The capability value of the ACL table 202 defines what privileges are being impacted. The privileges in the capability column are defined in combination with the action and inheritance columns. The table below identifies and describes some example capabilities (when coupled with an "Allow" action).

| Capabilities | Description |
| --- | --- |
| None | The subject has no privileges to the object. This can also be used to remove privileges from a subject. |
| Read | The subject can read the object. |
| Write | The subject can edit the object or add objects to a directory. |
| Comment | The subject can comment on an object. |
| Set ACL | The subject can define privileges for the object (editing of action, capability, or inheritance) for the object. |
| Delete | The subject can delete the object. |
| All | The subject has all privileges on an object. |

Collectively the sID, Action, Capability, and Inheritance columns represent a tuple that makes up specific permissions statements pertaining to an object. Each row can include multiple of these tuples pertaining to an object ID that were affected at the stated hybrid logical clock value.

Permissions can be added or changed for the object ID at a later time (later hybrid logical clock value), and those permission statements can be listed in a new row pertaining to the object ID and the later hybrid logical clock value.

In the case of links, the ability to create a link may be governed by existing permissions statements governing the object. For example, if an object is existing in object storage 142 with existing permissions statements, the ability to create a link depends on whether an accessing user is permitted to create a link.

In some embodiments, a new object can be stored in object storage 142 just for the purpose of sharing a link. For example, link service 136 might store an object in content storage 142 by interfacing with file system 116.

When link service 136 is permitted to create a link to an object in object storage 142, link service 136 interfaces with file system 116 to create a link_sID that identifies the link as an actor in the permissions statement tuple. Allowing the link to be an actor that is recognized by file system 116 provides benefits in that access to an object pointed to by a link does not require ongoing access by the entity that created the link for the link to remain effective. For example, if the entity that created the link loses access to the object, the link can continue to function. In another benefit, since the link is an actor that is recognized by file system 116, an anonymous user can still access the object via the link. The file system 116 and the link service 136 will recognize that the object is accessed by an anonymous user instead of providing access through a proxy of another user's access to the file system.

When referring to capabilities for a given object in the context of a content management system, it is common to refer to an Access Control List (ACL), which is a definition of all of the permissions provided to an object. In some embodiments, of the present technology, no ACL is stored, but it can be derived as will be addressed with respect to FIG. 7, below.

FIG. 3 also illustrates object table 212, which records information regarding changes made to an object. Object table 212 also includes columns for object ID and hybrid logical clock to identify the object and the system time that the modification occurred. In addition to recording changes made to objects, object table 212 can be used to identify versions of an object at particular times.

Object table 212 can also be used to identify an approximate date and time to which a hybrid logical clock value can correspond, called Modification Time. Modification Time is a representation of clock time (date and time of day) that a change was made.

Object table 212 also includes a column that identifies the type of object. For example, a column can indicate whether an object is a file or directory. In some embodiments, the modification to the object might not be to change the object itself but could be to mount a directory under another directory. In the example of a mount, the type of object can list a target object ID for the directory in which the object is mounted. As addressed above, the tables in FIG. 3 collectively record essential information to perform access, synchronization, and versioning tasks. The tables in FIG. 3 are configured to be highly efficient, wherein data that is not necessary for the efficient performance of the essential tasks of the content management system are excluded from these tables. Further, these tables are maintained individually to optimize how often, and the situations in which, it is necessary to write to these tables.

Figure 4:
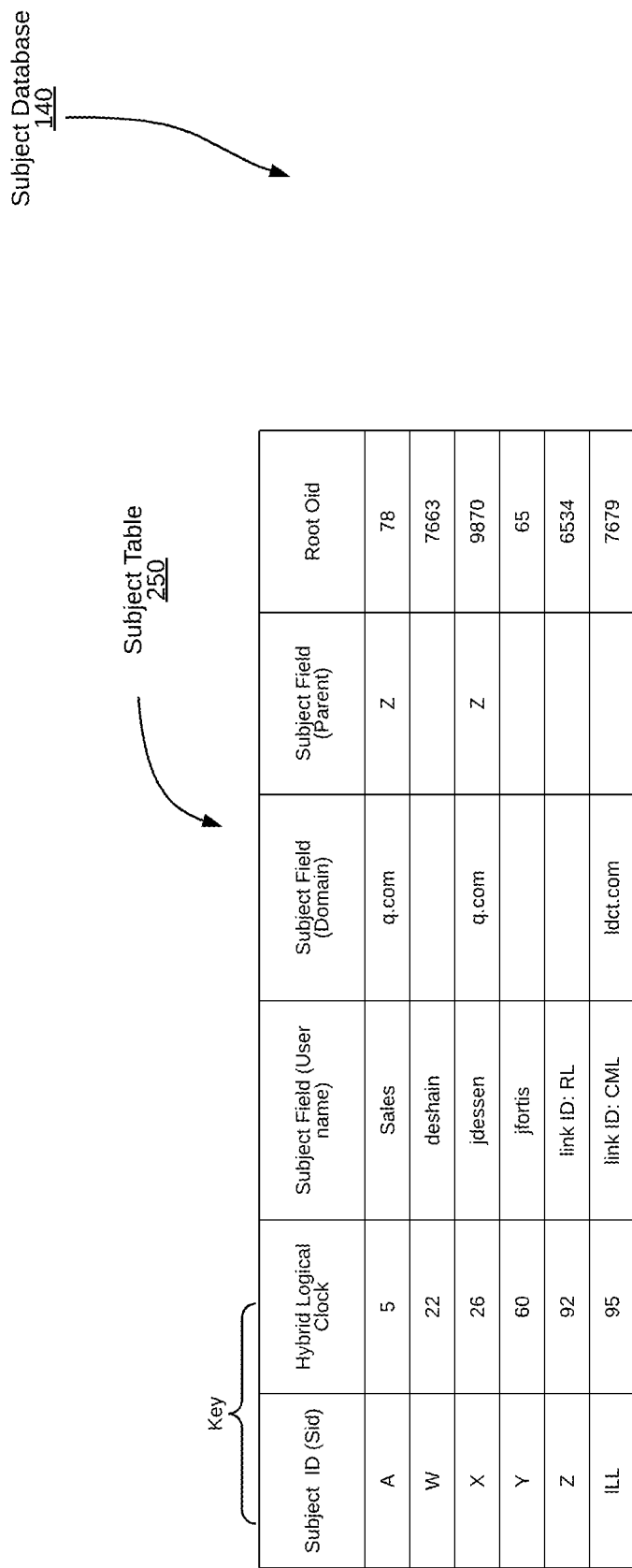
FIG. 4 illustrates subject database in accordance with some aspects of the present technology.

FIG. 4 illustrates subjects database 140. While in FIG. 2 subjects database 140 is shown as being stored outside of object storage 142, it will be appreciated that in some embodiments, subjects database 140 can be stored across shards 142n of object storage 142 just as with objects database 148.

Subject database 140 is configured to track essential information about the subject. The subject can be any entity that might have an account with content management system 110 and/or that can have access to or take action on an object. In some embodiments, a link can be a subject as it has access and can take action on an object. Subject database 140 can be broken into several different tables, or include additional information that is not illustrated in FIG. 4.

Subject table 250 is configured to record information about a subject which is represented in subject table 250 as a subject ID (sID). A new row can be written into subject table whenever a sID comes into existence, a sID is deleted, or some other aspect of the data recorded in subject table 250 is changed. In FIG. 4, sIDs: Z and ILL are link_sIDs.

In addition to the column of subject table 250 containing sIDs, subject table 250 also contains a column for hybrid logical clock (HLC) that can record a system time in which the change causing the row was affected.

Subject table 250 also contains various subject fields which record information about a subject account represented by that sID. For example, subject table 250 can also contain a subject field for a subject name associated with the subject account or an email address associated with the account. When a subject is a link, the subject name might be blank, or it might say "link", or can include a link ID provided by link service 136 as indicated in FIG. 4.

In some embodiments, subject table 250 can also record whether the subject account belongs to a particular domain. For example, if the subject account is associated with an organization that also has a subject account with content management system, subject table 250 can record the mapping between the subject account and its domain. When a subject is a link, the domain might record a domain when a third-party service 170 created the link as illustrated for Link_sID: ILL, which is associated with third-party service: ldct.com.

Subject table 250 also includes a column indicating whether a subject ID is managed or controlled by a parent subject ID. Just as objects can have ancestors from which an object can inherit certain properties, a subject can also have a parent. A parent of a subject can be a subject account that has the authority to manage the subject such as by giving restrictions or permissions to the subject. In some embodiments, a subject can also inherit certain properties from a parent subject. When a subject is a link, it might not be associated with any parent subject if the object only exists to be shared via the link, or the Link_sID might have the subject that created the link as its parent. The subject that created the link could be a subject representing another user account at the content management system, a subject representing link service 136, a subject representing third-party service 170 utilizing the link service 136 to create or manage a link.

Subject table 250 also includes a column denoting a root object ID. In some embodiments, every subject account represented by a sID can be associated with its own private directory which can appear as the root of its account. At the same time, other root objects can be mounted in the directory structure for the subject account below the root object for that subject. For example, the subject account may have a root directory called "root subject" and at the same time that subject account may be part of a group. The group itself may have its own root directory called "group". The group root directory can be mounted below the root directory for the subject such that a directory structure might look like "/root subject/group." In other cases, if the subject account is strictly tied to a subject account of an organization the root of the subject account may appear below the root of the organization. For example, if the organization has a root directory called "organization", the directory structure for the subject might look like "/organization/root subject". The specific relationship between one root directory and another root directory is purely one of implementation. However, these examples illustrate that each subject account has its own root directory and that any root directory can be mounted within another root directory such that it appears subordinate to another directory even though it is the root of a subject account.

When a link is created to an object that is already present in object storage 142, and therefore that object is already located under a root directory associated with at least one other subject, the object that has become shared by the link can remain located in its current place under the root directory associated with the other subject. The Link_sID can be granted access to the object that is located in its current place under the root directory associated with the other subject. In some embodiments, file system 116 may also create a root directory for the Link_sID, but that directory may not include the object as the object is located in its current place. Rather a root directory of the Link_sID could, in some embodiments, include a pointer or reference representing the object in its location in a directory for another subject.

File system 116 is capable of handling complex policies associated with access to objects. For example, policies can be associated with an object that only allows anonymous link callers read access, while link callers with identified sIDs known to file system 116 might have write access. It is also possible to grant link callers access only to a specific version of an object so while an object might be modified by its owner, link callers will only have access to a static document.

Subject table 250 is queried by receiving an identification of a sID and a range of HLC values and such queries can return any information shown in another column of subject table 250. While limited fields are illustrated as columns in subject table 250 it will be appreciated by those of ordinary skill in the art that additional fields can also be included.

Figure 5:
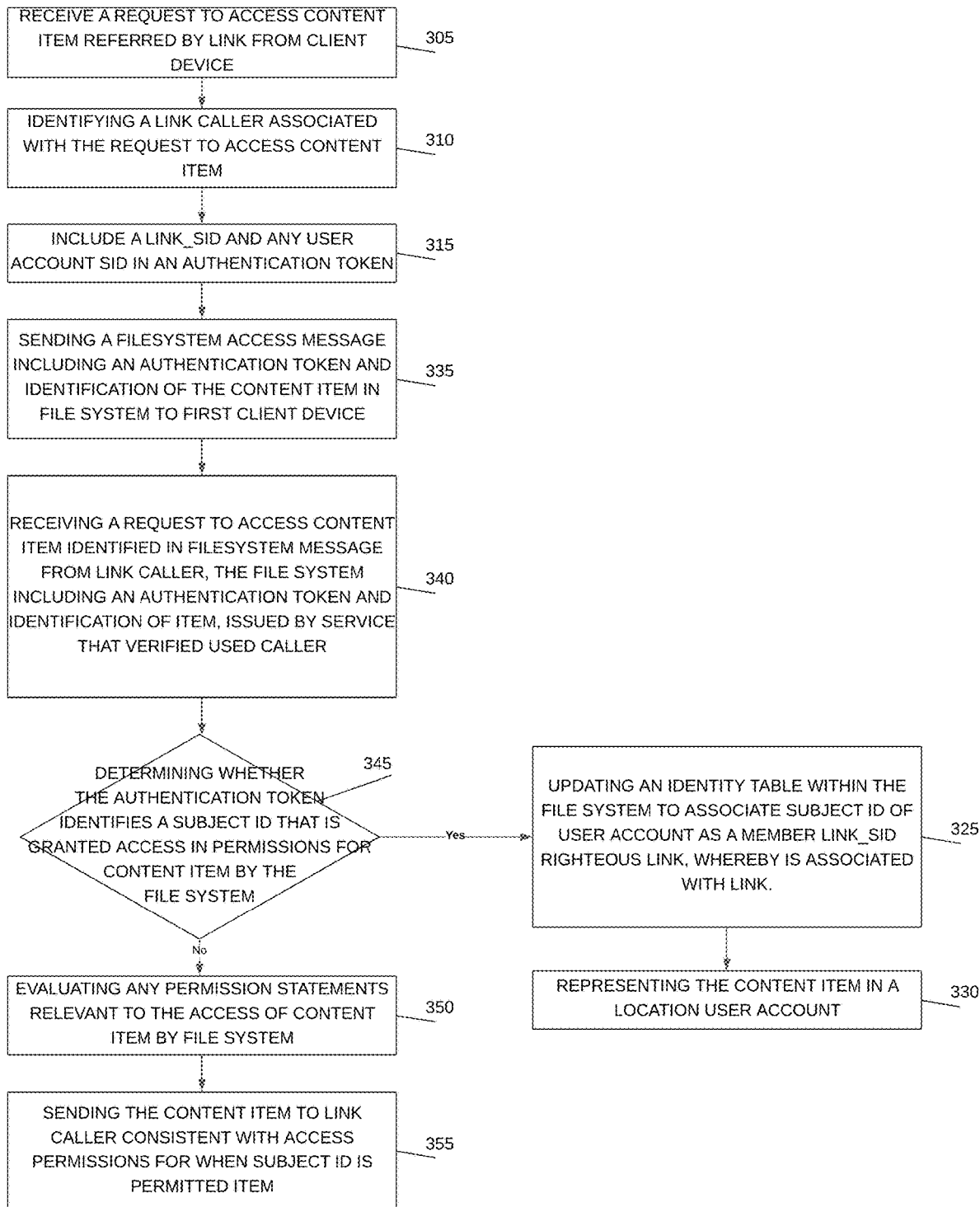
FIG. 5 illustrates an example method for accessing an object referenced by a link managed by the link service in accordance with some aspects of the present technology.
Figure 6:
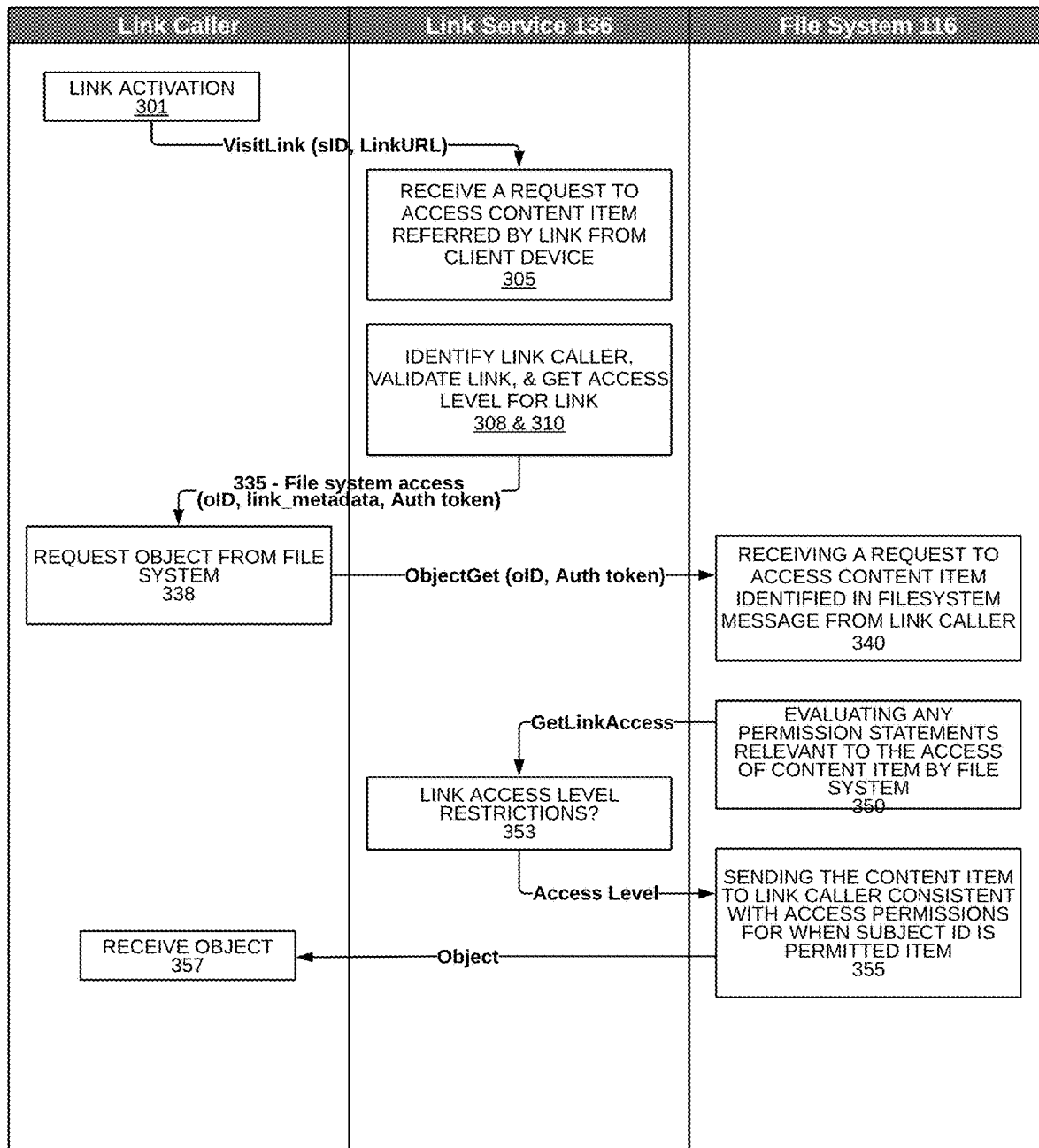
FIG. 6 illustrates an example sequence diagram for accessing an object referenced by a link managed by the link service in accordance with some aspects of the present technology.

FIG. 5 illustrates an example method for accessing an object referenced by a link managed by the link service, and FIG. 6 illustrates an example sequence diagram for accessing an object referenced by a link managed by the link service. Although the example method and sequence diagram depicts a particular sequence of operations, the sequence may be altered without departing from the scope of the present disclosure. For example, some of the operations depicted may be performed in parallel or in a different sequence that does not materially affect the function of the present technology. In other examples, different components of an example device or system that implements the present technology may perform functions at substantially the same time or in a specific sequence. FIG. 5 and FIG. 6 will be addressed together.

Initially, a link caller activates a link at node 301, which results in a request to access an object referred to by the link. The request can point to API 138 to request the object and can include data embedded in the LinkUrl, and can optionally include a subject ID if the Link Caller is associated with a session with content management system 110.

As used herein, a link caller can be a client device with a user that cannot be identified (anonymous user), a client device having an established session with content management system 110, a software service of content management system 110, or third-party service 170.

In some embodiments, the method includes receiving a request to access an object referred to by a link from a first client device at node 305. For example, link service 136 may receive a request to access an object referred to by a link from a first client device. In some embodiments, the request is directed to API 138 before being forwarded to link service 136.

After receiving the request to access the object, link service 136 can validate the link and/or perform other link services 308. In some embodiments, link service 136 can validate the link by determinizing whether the link is a currently valid link, that the link references a proper object, and by looking up various link metadata. The link metadata can include determining a link_sID, link properties, link capabilities (get object, modify link, etc.). In some embodiments, link service 136 can also perform a variety of link services as will be addressed further below. Some examples of link services are link logging, exploit prevention, link banning, rate throttling, etc.

Link service 138 can also identify the link caller as a user account or an anonymous account at node 310. For example, link service 136 can identify the link caller as a user account of content management system 110, or if no user account is identified, link service 136 can determine that the link caller is anonymous. In some embodiments, link service 136 can identify the user account of content management system 110 when the client device is associated with a session with content management system 110. In some embodiments, the request to access the object can include a sID for the user account. In some embodiments, link service 136 can interact with IAM service 132 to identify a user account and sID associated with the client device 150.

However, in some embodiments, link service 136 can identify an anonymous user account associated with the request to access the object. For example, when the client device calling the link is not associated with a session with content management system 110 or is otherwise unknown to IAM service 132, link service 136 may not be able to identify a known user account, and the link caller can be considered to be anonymous.

Whether the link caller is an identified user account or an anonymous user, the link can reference or be associated with a link_sID of the link.

Once link service 136 has extracted or learned any sID for a user account, if any, and the link_sID associated with the link itself, link service 136 can return a file system access object to client device 150 that includes an identification of the object in object storage 142 and a file system authentication token that includes any sIDs or link_sIDs that might provide permissions in file system 116 to access the object at node 315. For example, the link service 136 may include a link_sID for the link, and can include any sIDs associated with an identified user account, if any, in the authentication token. The authentication token gives a temporary access to file system 116 to the link caller.

The method further includes sending a file system access object 335 including the authentication token and an identification of the object in a file system to the first client device at node 335. For example, link service 136 may send the filesystem access message including the authentication token and the identification of the object in a file system to the first client device/link caller. The file system access object can also include metadata instructing the link caller to access one or more APIs at the file system to get the object or change permissions to the link, or to interact with Link Service 136 to modify other link properties, such as deleting the link.

Upon receiving the file system access object, client device 150 can request 338 the object directly from the file system. In some embodiments, the method includes receiving a request to access an object identified in the file system access message from the link caller at node 340. For example, file system 116 may receive a request to access the object identified in the file system access message from the link caller. The file system access object can include the authentication token and the identification of the object in the file system. As noted above, the authentication token was issued by link service 136 that verified the link used by the link caller.

In some embodiments, the method includes determining whether the authentication token identifies a subject ID (sID) for a user account that is granted access in access permissions for the object in addition to a link_sID at node 345. For example, the file system 116 may determine whether the authentication token identifies a subject ID. When file system 116 determines that a subject ID (sID) for a user account is included in the authentication token, file system 116 can determine whether an update to the subject database 140 or object database 148 is needed. For example, when file system 116 determines that the authentication token identifies the user account (sID) in addition to the link_sID the file system 116 can associate the subject ID (sID) of the user account as a member of the link_sID of the link in subject database 140, whereby the subject ID of the user account is associated with the link_sID of the link at node 325. In addition, file system 116 can associate the subject ID (sID) with the object in object database 148.

In some embodiments, the method includes representing the object in a location in the user account at node 330. For example, since the subject ID (sID) of a user account of content management system 110 is associated directly with the object ID (oID), the object can be represented in a location in the user account.

In some embodiments, the method includes evaluating any permission statements relevant to the access of the object by the file system at node 350. For example, the file system 116 may evaluate any permission statements relevant to the access of the object by the file system pertaining to any sID or link_sID identified at determination 345. One advantage of the present technology is that the file system 116 has ultimate control over object access. File system 116 can evaluate object access as it normally would for any other object such that the file system 116 will only determine that the object can be served if a subject ID associated with the object (whether the link_sID or other sID) is permitted to access the object in the access control list. More detail on how file system 116 can determine whether a subject ID (sID or link_sID) has access to an object is provided with respect to FIG. 7.

While file system 116 has control over access to an object, file system 116 may also query link service 136 to determine if link service 136 might have additional access restrictions or to confirm that the link is valid. For example, the file system 116 may request the access permissions for the object from the link service 136, and link service 136 can determine 353 and send any access restrictions to file system 116. In some embodiments, some of the link access restrictions checks 353 may be redundant with steps taken at 308, however, this check can confirm that the link has not been revoked in the time since issuing the file system access object 335. The link access restriction check 353 can also be used to implement additional link policies not natively supported by file system 116.

In some embodiments, the method includes sending the object to the link caller consistent with the access permissions for the object when the subject ID is permitted access to the object at node 355. For example, the file system 116 may send the object to the link caller consistent with the access permissions for the object when the subject ID is permitted access to the object.

The link caller can receive 357 the object.

Figure 7:
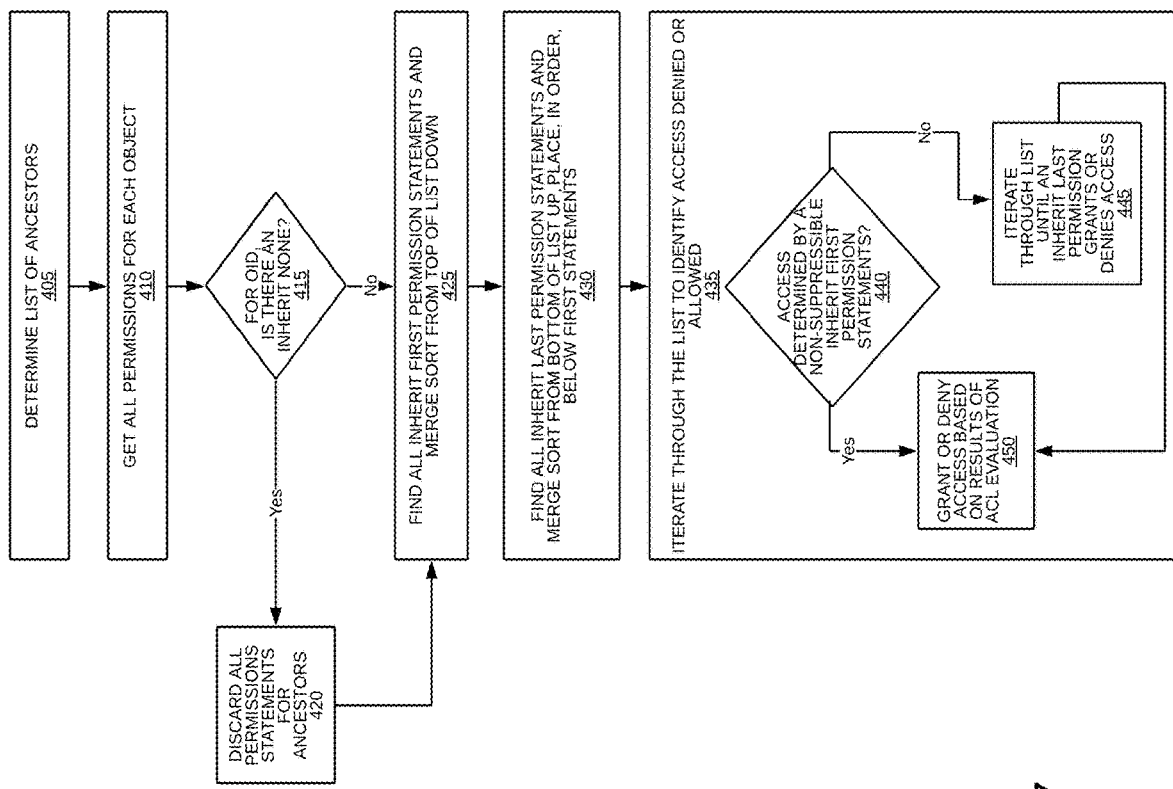
FIG. 7 illustrates an example method for evaluating an access control list composed from individual permission statements for an object in a directory tree in accordance with some aspects of the present technology.

FIG. 7 illustrates an example method for evaluating an access control list composed of individual permission statements for an object in a directory tree. Although the example method illustrated in FIG. 7 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As addressed above, a complete access control list for any object might not persist in content management system 110. Instead, an ACL list for a particular object is a vector of all permissions statements recorded in ACL table 202 for all objects in a directory tree above the particular object. The method illustrated in FIG. 7 first determines a list of ancestors above the particular object and then composes and evaluates the ACL.

It can be necessary to determine a subject's permissions as defined by the ACL for the object when a client acting on behalf of a subject account requests access to an object or requests to write to objects database 148 and object storage 142.

In some embodiments, the method includes determining a list of ancestors of a specified object ID at step 405. For example, the file system 116 may determine a list of ancestors of the object ID. In an example, determining a list of ancestors may include recursively performing several steps including retrieving a next ancestor object ID by looking up a query object ID (starting with the specified object ID) in a table containing ancestor data, building the list of ancestors by adding the next ancestor object ID as an ancestor to the query object ID, and making the next ancestor ID the query object ID. This recursive process of building the list can complete when a root of the tree is reached.

In some embodiments, for the purposes of determining an access control list for an object, a tree can include roots not accessible by the subject account. The recursive process of building the directory tree can build a directory tree that has multiple roots, or even multiple trees that do not cross. This is a result of the ability of content management system 110 to share objects that are stored below a root object to which the subject does not have access.

In some embodiments, the method includes obtaining access permissions for each object ID in the tree of ancestors at step 410. For example, file system 116 may obtain a permission statement for each object ID in the tree of ancestors from the ACL table 202. As addressed above, an access permission for an object defines at least a subject to which the access permission applies, a capability granted to the subject, a permission given to the subject (allow, deny, etc.) for the object, and an inheritance property for the access permission.

In some embodiments, the method includes ordering permissions statements into an ordered list according to the inheritance properties of the respective permissions statements. A particular permission statement can have the inheritance property of "first" and can be non-suppressible, whereby any subsequent permissions statement in the ordered list of permission statements cannot override the particular permission statement. A particular permission statement can have the inheritance property of "first" and can be suppressible, whereby any subsequent permissions statement in the ordered list of permission statements can override the particular permission statement. Any permission statement having an inherit first property will be sorted to the top of the ordered list unless a subsequent permission statement requires that it is removed. A particular permission statement can have an inheritance property of "last" and these permission statements will be sorted to the end of the ordered list. A particular permission statement can have an inheritance property of "inherit none" and no permission statement will appear in the ordered list. A particular permission statement can have an inheritance property of "deny inherit" where the object ID will not inherit any permissions from its ancestors unless the permissions statement of an ancestor is "first" and "non-suppressible."

File system 116 can determine (613) whether the obtained permission for any object in the directory tree includes an inheritance property of "inherit none," and if so, file system 116 can discard (614) the permission statement for that object. A property of "inherit none" only applies to the particular object ID to which it is associated and does not affect whether any ancestor or descendant policies are merged and sorted into in the list.

File system 116 can determine (415) whether the obtained permission for any object in the directory tree includes an inheritance property of "deny inherit," and if so, file system 116 can discard (420) permission statements from all ancestors (objects above the object ID with the property of deny inherit in a directory tree) unless the inheritance policy is a non-suppressible, inherit-first policy. Discarded permission statements are not merged and sorted into the list.

With the remaining permission statements, file system 116 can perform a merge and sort of these permission statements to order them appropriately for evaluation. The ordering of the permission statements can include determining (425) that a permission statement for an object ID in the obtained permission statements has an inheritance property of "first." File system 116 can arrange the permission statements having an inheritance property of "first" above the permission statements having an inheritance property of "last" in the ordered list of permission statements by merging and sorting these permissions from a top of a list down, where each permission is included in the list in the order in which it appears from top to bottom in the directory tree.

The ordering of the permission statements can further include determining that a permission statement for an object ID in the obtained permission statements has an inheritance property of "last." File system 116 can arrange (430) the permission statements pertaining to an ancestor of the object ID having a permission statement with the inheritance property of "last" in the ordered list of permission statements by merging and sorting these permissions in the inverse relative order as their respective ancestors are arranged in the tree of ancestors. In other words, an access permission for an object at the bottom of the directory tree will be placed in the ordered list of permission statements above a permission statement for an object that is located higher in the directory tree. However, all of the inherit "last" access permissions will be placed into the ordered list below access permissions with an inherit "first" permission statement. The ordered list of all access permissions for an object can be considered the access control list (ACL) for the object.

In some embodiments, the method includes iterating through the ordered list of permission statements, in order, until a permissions statement grants or denies access to the object at step 435. For example, the file system 116 may iterate through the ordered list of permission statements, in order, to determine whether access should be granted or denied.

In some embodiments, the iterating through the list can terminate when a permissions statement grants or denies access. If a inherit first permission can be suppressed, then it can be necessary to at least iterate through the tree until one of the inherit "last" permissions statements provides or denies access. Therefore, determining whether access should be granted or denied includes determining (440) whether access is granted or denied by a non-suppressible inherit first permission. If a non-suppressible permissions statement does not resolve the access determination, then file system 116 can evaluate (445) the rest of the ordered list of permission statements until an inherit last permissions statement grants or denies access, and can grant or deny (450) access based on the results of the ACL evaluation.

In some embodiments, suppressible inherit first access policies can also be handled by noting whether those policies are suppressed by an inherit last policy associated with an object elsewhere in the tree. In such instances, the suppressed inherit first access policy can be excluded from the merge and sort (425) and the list of permission statements can be evaluated using straightforward iteration (435) of the list of permission statements without regard for the sub-method made up from steps 440, 445, and 450.

In some embodiments, the output of FIG. 7 can be a list of capabilities to any evaluated object.

The access determination method depicted in FIG. 7 can have the benefit of being very flexible. Permissions statements can be crafted that provide access to anyone accessing the object by the link but can provide more specific access permissions to subjects IDs known to the content management system. For example, a user account of the content management can be granted greater access than an anonymous user.

In the case of shared links, the root of a tree will generally either be at the level of the shared object for objects that are stored in content management system 110 for the purpose of sharing using a link, or will be mounted from another location in content management system 110 when the object is being shared from within an existing user account. In the first instance, when the object is stored at the root of a link_sID account, the outcome of the method illustrated in FIG. 7 will generally be determined by the access that the link provides. Whereas, when the link provides access to an object stored elsewhere in content management system 110 and mounted into the root of the link_sID account, access will be determined by any restrictions on access to the object itself and access provided by the link.

Figure 8:
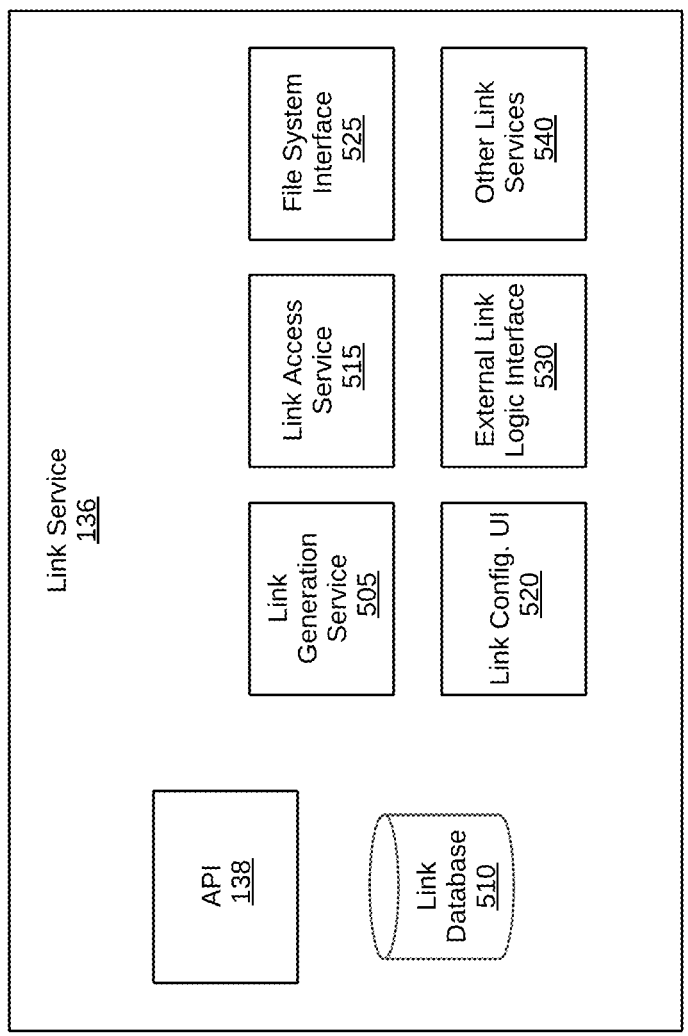
FIG. 8 illustrates an example link service and some example services performed by the link service in accordance with some aspects of the present technology.

FIG. 8 illustrates link service 136 and some example services performed by link service 136. As addressed above link service 136 can operate as a software-as-a-service platform wherein link service 136 can perform all services associated with issuing, managing, and handling links. It will be appreciated by those of ordinary skill in the art that FIG. 8 may not illustrate all possible services that can be offered by link service 136 operating as a software-as-a-service platform. Link service 136 be a service offered as part of content management system 110, or link service 136 can be a separate service.

As addressed above, link callers, users, and services wanting to take advantage of link service 136 can contact link service 136 by calling one or more APIs 138 provided by the link service 136. For example, a user or service can call a link generation API which may cause API 138 to initiate link configuration user interface 520 for presentation to a user to configure a link. In another example, a link caller may call a link access API, and API 138 can interface with link access service 515 to obtain the object referred to by the link. In another example, file system 116 can make a call to a link access level API, and API 138 can interface with link access service 515 to determine a level of access provided by a link. As will be appreciated by those of ordinary skill in the art there can be many API's offered by link service 136 that correspond to one or more functions that can be provided by link service 136.

FIG. 9 illustrates some example APIs and their functions. The APIs and their example functions addressed herein should not be considered a limitation of the functions that can be performed by link service 136.

Figure 11A:
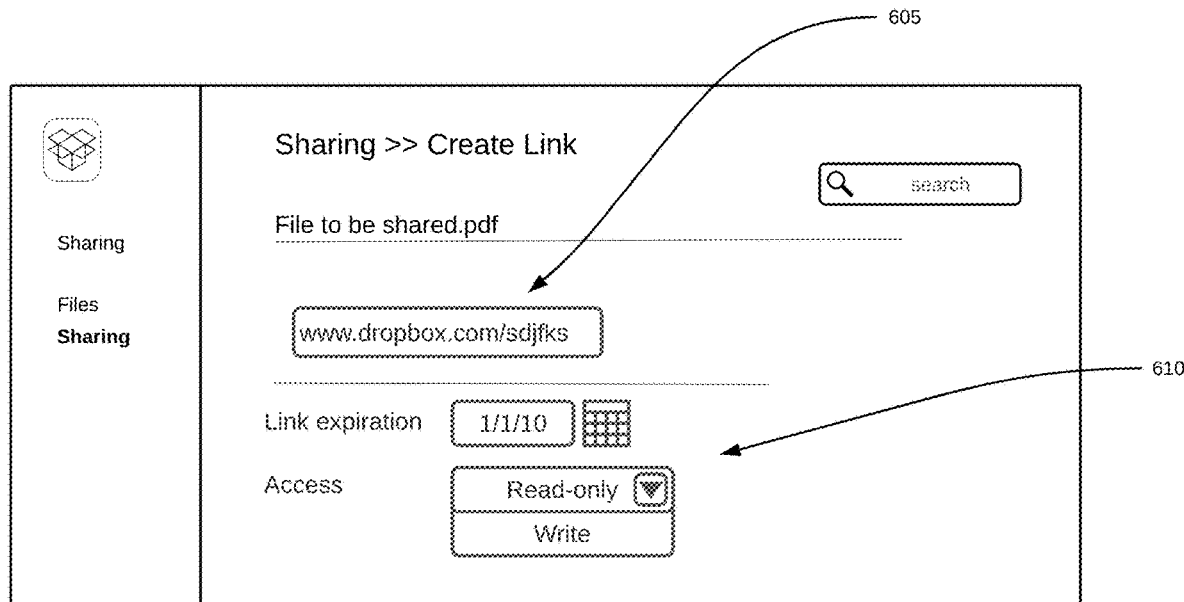
FIG. 11A illustrates an example user interface for creating a link using the link service in accordance with some aspects of the present technology.

One function of link service 136 can be the creation of a link to an object. As such link service 136 includes a link configuration user interface 520 that can be presented through a web browser or an application on client device 150 to a user to create and configure a link to an object. As will be addressed further below FIG. 11A illustrates an example graphical user interface provided by link configuration user interface 520.

Link service 136 can also include link generation service 505. Link generation service 505 can create a link as configured by a user using a link creation graphical user interface, or as instructed by a software service such as a third-party service 170 or an application interfacing with link service 136 through one or more APIs 138.

Figure 10:
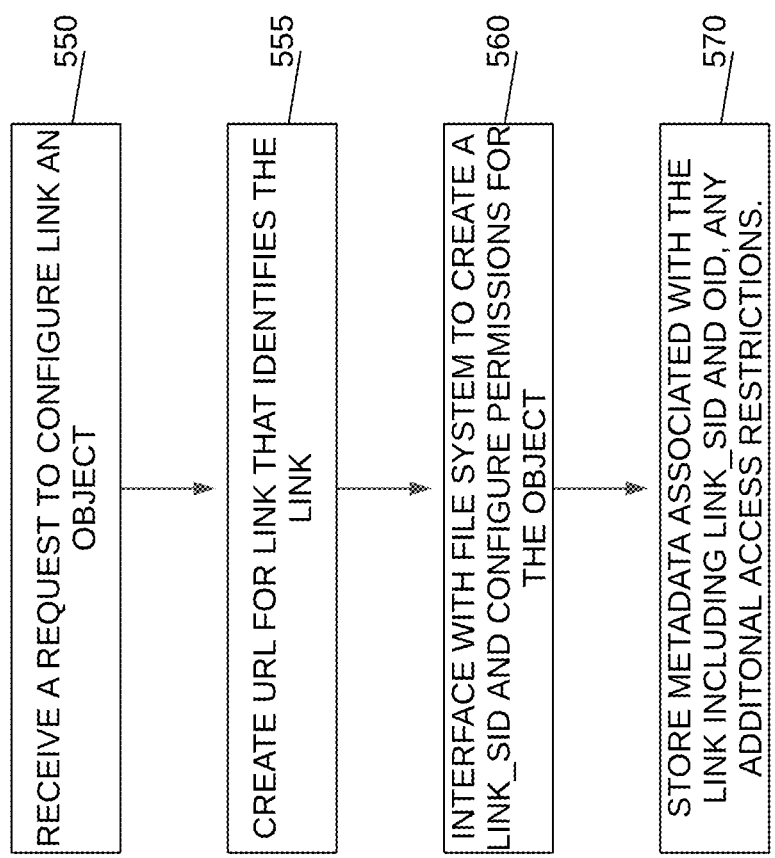
FIG. 10 illustrates an example method for creating a link in accordance with some aspects of the present technology.

For example, FIG. 10 illustrates an example method for creating a link. Link generation service 505 can receive a request 550 to configure a link to an object where the request can identify the object. In some embodiments, the request 550 to configure the link to an object can come from a user interface such as illustrated in FIG. 11A, or request 550 to configure the link to an object can come from a service interacting via an API 138. Link generation service 505 can create 555 a URL for the link where the URL uniquely identifies the link to link service 136. Link service 136 can also interface 560 with file system 116 to configure the link in file system 116. Link service 136 can perform these functions using file system interface 525 which can communicate with file system 116 to establish 560 the link as an actor in the file system as addressed above. File system interface 525 can also configure 560 any permission statements relevant to the link for inclusion in the access control list for the object.

In some environments, the request 550 to configure a link to an object can identify the object by its oID when the object is stored in object database 142. However, such as when the request 550 to configure a link to an object refers to an object that is not stored in object database 142, the request can include the object itself for storage in object database 142. In some embodiments, it may not be necessary for an object referenced by a link to be stored in object database 142. Link service 136 can interface with third-party services to provide link services that reference object stored at the third-party service 170.

In addition to interfacing with file system 116, link generation service 505 can store 570 metadata associated with the link including the link_sID and oID for the linked object and any additional access restrictions in link database 510.

Link service 136 also provides services related to accessing objects by a link caller. For example, link service 136 can receive requests to access objects from a link caller that has activated a link issued by link generation service 505. Link service 136 can utilize link access service 515 to validate that the link is valid and to look up link metadata in link database 510. Link metadata can include information about a type of link (a link issued by link service, a link issued by a partner service, a legacy link supported by link service, etc.), link permissions, link configurations, policies associated with the link, an entity that established a link, etc. Additionally, in some embodiments, file system 116 can request additional information regarding link access levels, and link access service 515 can return any necessary information.

Link service 136 can also interface with external services to manage links. In some environments, link service 136 can provide links to a third-party service 170 using link generation service 505, but in some embodiments, a third-party service 170 or a legacy service 135 may have created the link and desires link service 136 to manage aspects of maintaining and servicing the link. In such embodiments, external link logic interface 530 can be used to interface with third-party service 170 or legacy link service 135 to determine if a link is valid or subject to any restrictions.

In addition to creating links, and handling visiting of links, link service 136 can further provide other link services. As illustrated in FIG. 8, other link services 540 illustrates a generic placeholder to illustrate any additional link services. Some example link services include link management, limiting a rate at which a link can be visited, abuse prevention, banning of links, preventing link creation for non-verified users, ensuring conformance with sharing policies that may be associated with an object, standard link settings, expiry, password, audience management, analytics, metrics and logging, link sender and visitor tracking, audit logging, admin functions, data loss prevention, integration with filesystem permissions, etc.

FIG. 11A illustrates an example user interface for creating a link using link service 136. Link configuration UI 520 can present the user interface presented in FIG. 11A as the result of a request by a user that has access to the object to which a link is to be created. For example, link configuration UI 520 can present the user interface presented in FIG. 11A as a result of a user calling the GetFileLinkActions API as illustrated in FIG. 9.

The user interface illustrated in FIG. 11A can generate a link by calling the CreateApplicationLink API and present a public version of the link in field 605. The link can further be configured with one or more options 610. As illustrated in FIG. 11A some options 610 can include providing a link expiration and specifying the type of access. While not illustrated in FIG. 11A it should be appreciated that other options and more complex versions of these options can be supported. For example, various levels of link access might be provided depending on whether the link caller is anonymous, or is in a list of specified sIDs, or if the link caller provides a password, etc.

Figure 11B:
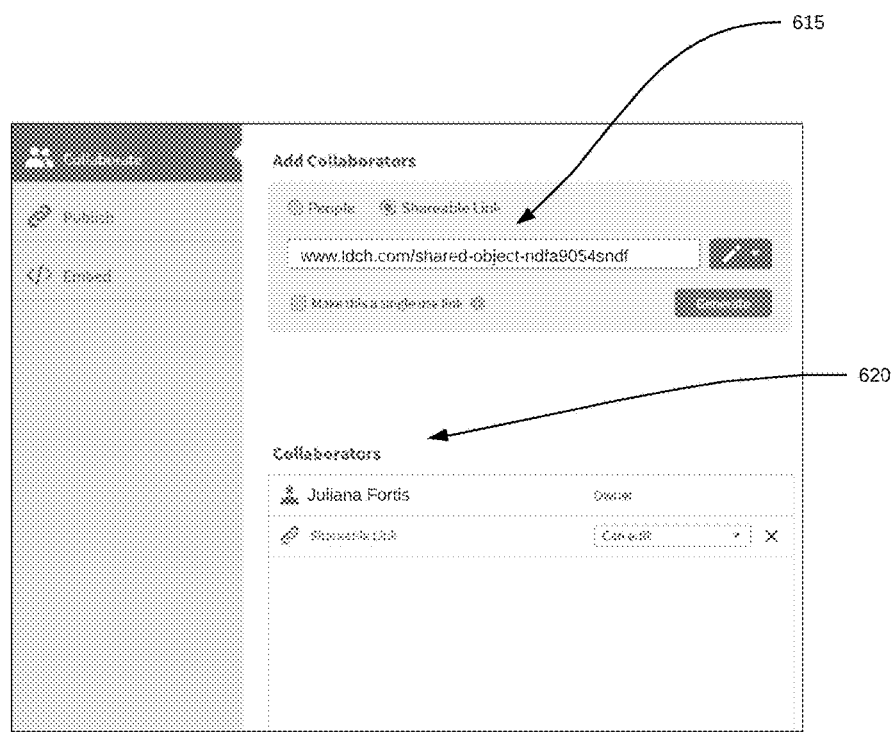
FIG. 11B illustrates an example user interface provided by a third-party service, where the third-party service can create a link that can redirect to the link service in accordance with some aspects of the present technology.

FIG. 11B illustrates a user interface provided by third-party service 170, where third-party service 170 can create a link 615 that can redirect to link service 136. Third-party service 170 may link to content stored at third-party service 170 or the content can be stored by content management system 110 in object storage 142. FIG. 11B also provides link options 620 such as to name specific collaborators with which to share the link and a level of link access. While not illustrated in FIG. 11B it should be appreciated that other options and more complex versions of these options can be supported.

Figure 12A:
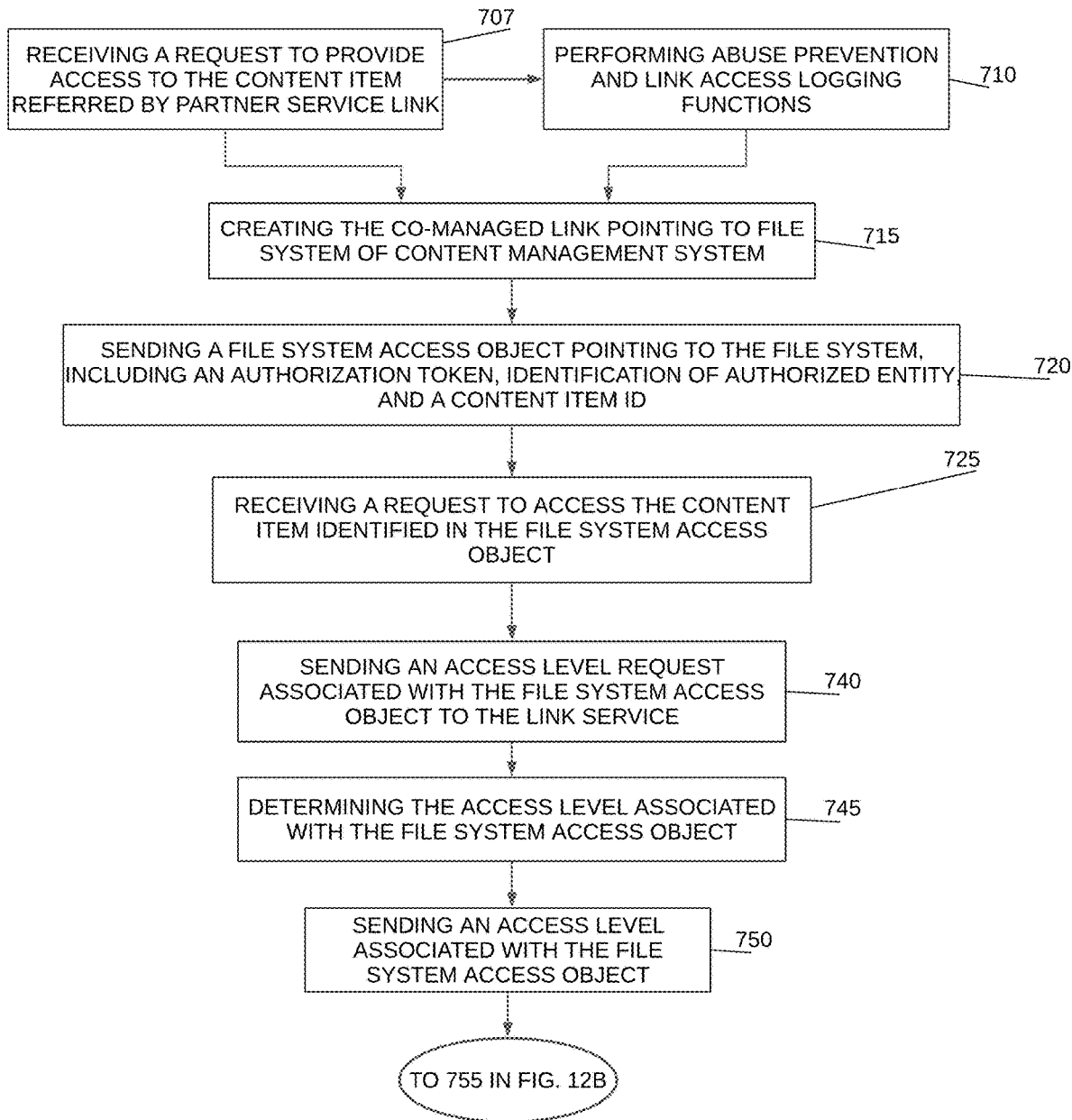
FIG. 12A and FIG. 12B illustrate portions of an example method for co-managing a link by the link service, operating as a link-platform-as-a-service, and the third-party service in accordance with some aspects of the present technology.
Figure 12B:
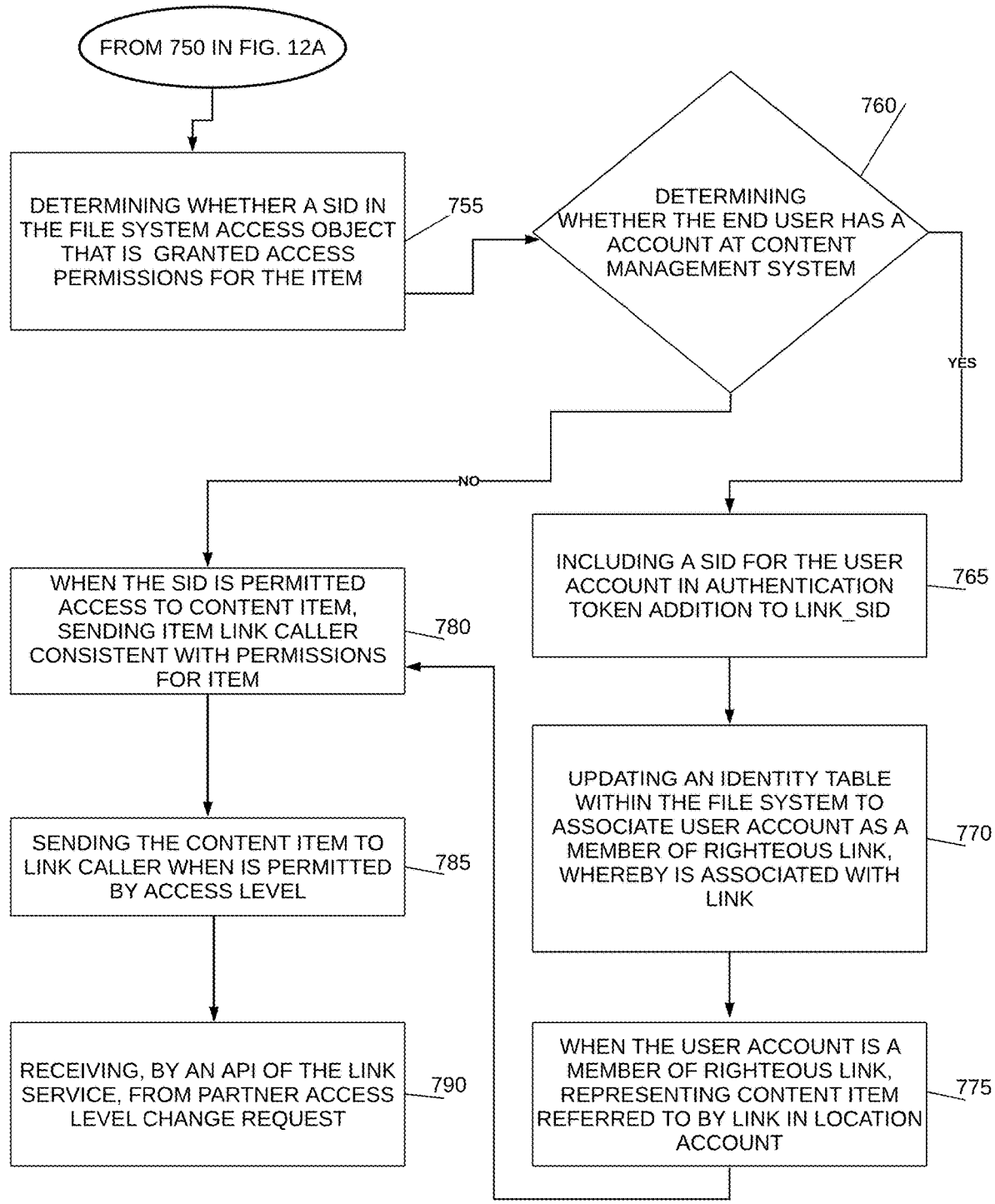

FIG. 12A and FIG. 12B illustrate portions of an example method for co-managing a link by link service 136, operating as a link-platform-as-a-service, and third-party service 170.

Figure 13:
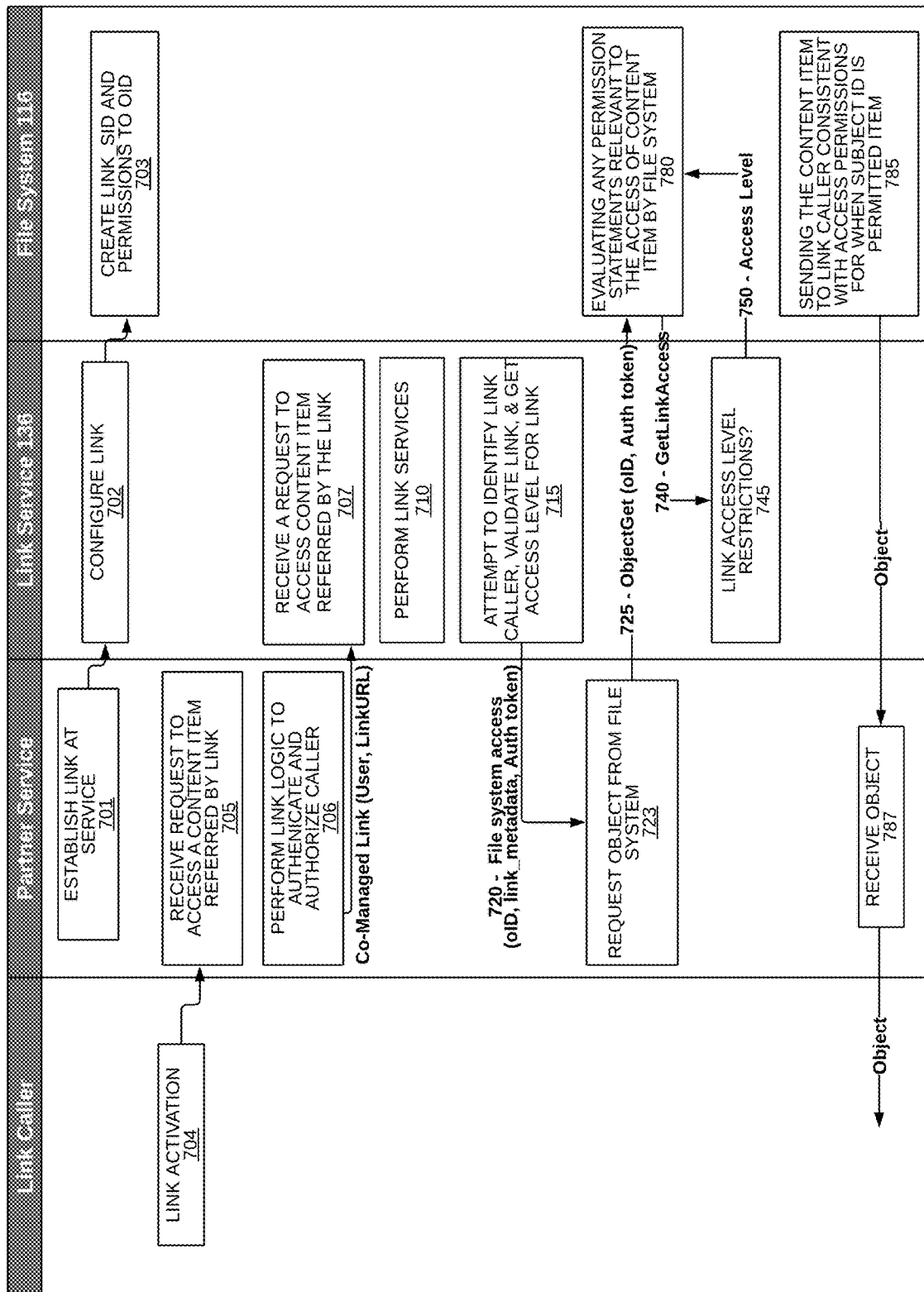
FIG. 13 illustrates an example sequence diagram for co-managing the link by the link service in accordance with some aspects of the present technology.

FIG. 13 illustrates an example sequence diagram for co-managing the link by the link service 136. Co-management of the link can include link service 136 and third-party service 170 both being able to configure the link, supply link logic to determine when a link is valid or accessible, among other aspects.

While FIG. 12A and FIG. 12B will be discussed with respect to third-party service 170 as an example of a partner service, it will be appreciated that any service that co-manages a link with link service 136 is also possible.

Although the example method illustrated in FIG. 12A, FIG. 12B and the sequence in FIG. 13 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

A partner service (third-party service 170, or another service of content management system 110) can configure a link for co-management by link service 136. For example, the partner service can request to establish 701 a link at link service 136, and link service 136 can configure 702 the link. Part of configuring the link is to interface with file system 116 to create a link_sID for the link and provide the link_sID with permissions to access an object referenced by the link. The partner service may already store the object in file system 116, or it may send the object for storage by file system 116 as part of establishing 701 the link at link service 136.

In some embodiments, a link caller can activate 704 the link that is issued by the partner service, which can cause the partner service to receive 705 a request to access the object. The partner service can perform 706 its own link logic and authenticate the link and authorize the link caller. In some embodiments, the partner service might not perform this step.

The partner service can maintain a mapping of links it has issued and co-managed links that are co-managed by the partner service and link service 136. After receiving the request to access the object 705 and optionally performing any link logic 706, partner service can contact link service 136 using the co-managed link that corresponds to the link issued by the partner service that was activated by the link caller.

In some embodiments, the method includes receiving a request to provide access to an object referred to by a partner service link at node 707. For example, link service 136 can receive, from partner service, a request to provide access to an object referred to by a partner service link. In some embodiments, the request to provide access to the object from the partner service occurs after the partner service makes its own determination that the partner service link caller is authorized to access the object. For example, the partner service link may point to third-party service 170, and therefore when a user activates the link and becomes the link caller, they will be directed to third-party service 170. Third-party service 170 can utilize their own criteria for determining 706 whether the partner service link is valid and if the link caller is authorized, then the partner service can contact link service 136 using a co-managed link stored by the partner service.

In some embodiments, the partner service may send the co-managed link to the link caller, and instruct the link caller to follow the link to link service 136, where link service 136 can interact directly with the link caller.

In some embodiments, it is also possible that the partner service could have also established a link using link service 136 and sent that link to the link caller. In such embodiments the link caller would not interact with partner service at all when calling the link.

In some embodiments, the partner link can be the co-managed link, whereby the link caller can be directed directly to link service 136, without first contacting the partner service, where link service 136 can recognize the link as a co-managed link, and can optionally interface with third-party service 170 using external link logic interface 530 to allow third-party service to determine whether the link is valid and if the link caller is authorized. In these ways, the partner service and the link service can both make their own access determination. Such an embodiment can be useful when the partner service wants less involvement in the link handling process, and can result in the partner service issuing a link that it does not have to service. At the same time, the partner service, as the link issuer, can interface with link service 136 to configure (or reconfigure) the link as desired).

Accordingly, while there are mechanisms for the partner service to be less involved in the management of a link and the servicing of a link caller, FIG. 13 contemplates an embodiment wherein the partner service wants to appear as if it has issued the link and is serving the object.

It will be appreciated that co-management of a link by the partner service can include sharing of any link management or link servicing functions and is not limited to determining whether the link is valid and if the link caller is authorized.

In some embodiments, the identification 715 of the authorized entity is a s_ID corresponding to the link. When the partner service link directs the link caller directly to the partner service, the partner service can include additional information to link service 136 when they contact link service 136 using the co-managed link. For example, the request to provide access to the object referred to by the partner service link can identify an end user requesting the object and any user identifying information can be included in the request 707 to the link service.

Even when the partner service does not know a sID of a link caller, the partner service can forward an email address or other user identifier, if known. Link service 136 can attempt to match any email address or user identifier with information that maps to a sID in subject database 250.

In some embodiments, the method includes performing abuse prevention and link access logging functions at node 710. For example, link service 136 may perform abuse prevention and link access logging functions, and/or any other service desired from link service 136 operating as a link platform-as-a-service.

After receiving the request to access the object, link service 136 can validate 715 the link and/or perform other link services 308. In some embodiments, link service 136 can validate the link by determinizing whether the link is a currently valid link, that the link references a proper object, and by looking up various link metadata. The link metadata can include determining a link_sID, link properties, link capabilities (get object, modify link, etc.).

In some embodiments, after link service 136 and the partner service have determined that the link is valid and performed any other services with respect to the link, the method includes creating a file system access object pointing to file system 116 of content management system 110 at node 715. In some embodiments, the file system access object includes a token having time-to-live to limit a time in which the file system access object remains valid. The file system access object allows an entity having the auth token within the file system access object to interface with file system 116 to retrieve the object. The time-to-live ensures that future calls for the object are made using the original link so that link service 136 and the partner service can perform the functions they desire when a link is called.

In some embodiments, the method includes sending, by link service 136 to the partner service, the file system access object pointing to the file system. The file system access object includes an authorization token, an identification of an authorized entity, and an object ID at node 720. The file system access object can include information needed to access file system 116 and can identify any subject IDs known to link service 136. For example, the file system access object can include a link_sID for the link, and if the link caller is can be associated with a user account known to content management system 110 the file system access object can include the user account sID. The file system access object can also include an object ID identifying the object to file system 116.

The file system access object can also include metadata instructing the link caller to access one or more APIs at the file system to get the object or change permissions to the link, or to interact with Link Service 136 to modify other link properties, such as deleting the link.

In some embodiments, the partner service can receive the file system access object and request 723 the object from file system 116.

The method further includes receiving, by the file system, a request to access the object identified in the file system access object at node 725. For example, the file system 116 may receive a request to access the object identified in the file system access object.

In some embodiments, the method includes sending, by the file system, an access level request associated with the file system access object to the link service at node 740. For example, file system 116 may send an access level request associated with the file system access object to link service 116. While file system 116 can determine permissions granted to a subject ID with respect to an object, in some embodiments, link service 136 may also include some additional configurations that can affect access to the object. Accordingly, file system 116 can communicate with link service 136 to determine any additional access level information.

The link service 136 may determine 745 the access level associated with the file system access object, and send 750 an access level associated with the redirect link to the file system 116. In some embodiments, some of the link access restrictions checks 353 may be redundant with steps taken at 308, however, this check can confirm that the link has not been revoked in the time since issuing the file system access object 335. The link access restriction check 353 can also be used to implement additional link policies not natively supported by file system 116.

In some embodiments, the method includes determining, by the file system, whether the file system access object identifies a sID that is granted access in the access permissions for the object at node 755. For example, the file system 116 may determine whether the file system access object identifies a sID that is granted access in the access permissions for the object. The authorization token in the redirect link should at least identify a link_sID which permits the link to be an actor within the file system. In some embodiments, the authorization token might also identify a sID for a user account at the content management system.

In some embodiments, the method includes determining that the end user has a user account at the content management system at node 760. In some embodiments, file system 116 may also determine that the link caller has a user account at content management system 110. For example, link service 136 may have learned that the link caller has an active session with content management system 110 and included 765 the sID for the user account in the authorization token. Alternatively, file system 116 may detect the active session or otherwise identify the link caller as being associated with a user account sID. For example, link service 136 or file system 116 might identify a sID associated with an email address associated with the link caller that is provided by the partner service.

When it is determined 760 that the link caller has a user account at content management system 110, the method includes updating an identity table within file system 116 to associate the user account as a member of the link, whereby the user account is associated with the link at node 770. In some embodiments, file system 116 represents the object referred to by the link in a location in the user account at node 775. For example, the object can be added to the user account by associating the user account sID and the oID for the object in file system 116, thereby making the object accessible directly to the user account without requiring the link for future access.

In some embodiments, when the sID is permitted access to the object, sending the object to the partner service consistent with the access permissions for the object at node

780. For example, as long as the authorization token identifies a valid link_sID that provides access to the object, the link caller can receive the object. This allows anonymous users to access objects referred to by a link. When the sID is permitted access to the object, file system 116 sends the object to the link caller consistent with the access permissions for the object.

In some embodiments, the method includes sending 785 the object to the entity that contacted link service 136. For example, if the partner service provided a link to link service 136, the link caller will receive 787 the object directly from file system 116. FIG. 13 illustrates an embodiment wherein file system 116 will send 785 the object to the partner service, and the partner service can forward the object to the link caller. In such an embodiment, this allows the partner service to wrap the object in any UI or markings to make it appear as if the object was served by the partner service.

Co-management of a link by a partner service and a link service can include more than both entities applying link logic to determine if a link caller should be entitled to access to an object. While FIG. 13 illustrates an embodiment wherein a link caller is requesting an object, the partner service can interact with link service 136 through the co-managed link upon its own initiation.

Co-management of the link allows both entities (the partner service and the link service 136) to participate in ongoing management on the link including modifying a configuration of the link or deleting a link or further sharing a link, etc. In some embodiments, the method includes receiving, by an API of the link service, from the partner service, an access level change request at node 790. For example, API 138 of the link service may receive an access level change request from the partner service, such as third-party service 170. In some embodiments, the access level change request includes a change in a least one access parameter for the object. The change in the at least one access parameter can be applied to the end user having the link.

Other operations are also possible. In some embodiments the partner service can contact link service 136 using the co-managed link. Link service 136 can return link metadata including a collection of possible link functions that can be performed by link service 136 or by the partner service interacting with file system 116. The partner service can then contact the appropriate API of link service 136 or file system 116 to perform the management function or to request or modify the object that is the subject of the link.

Figure 14:
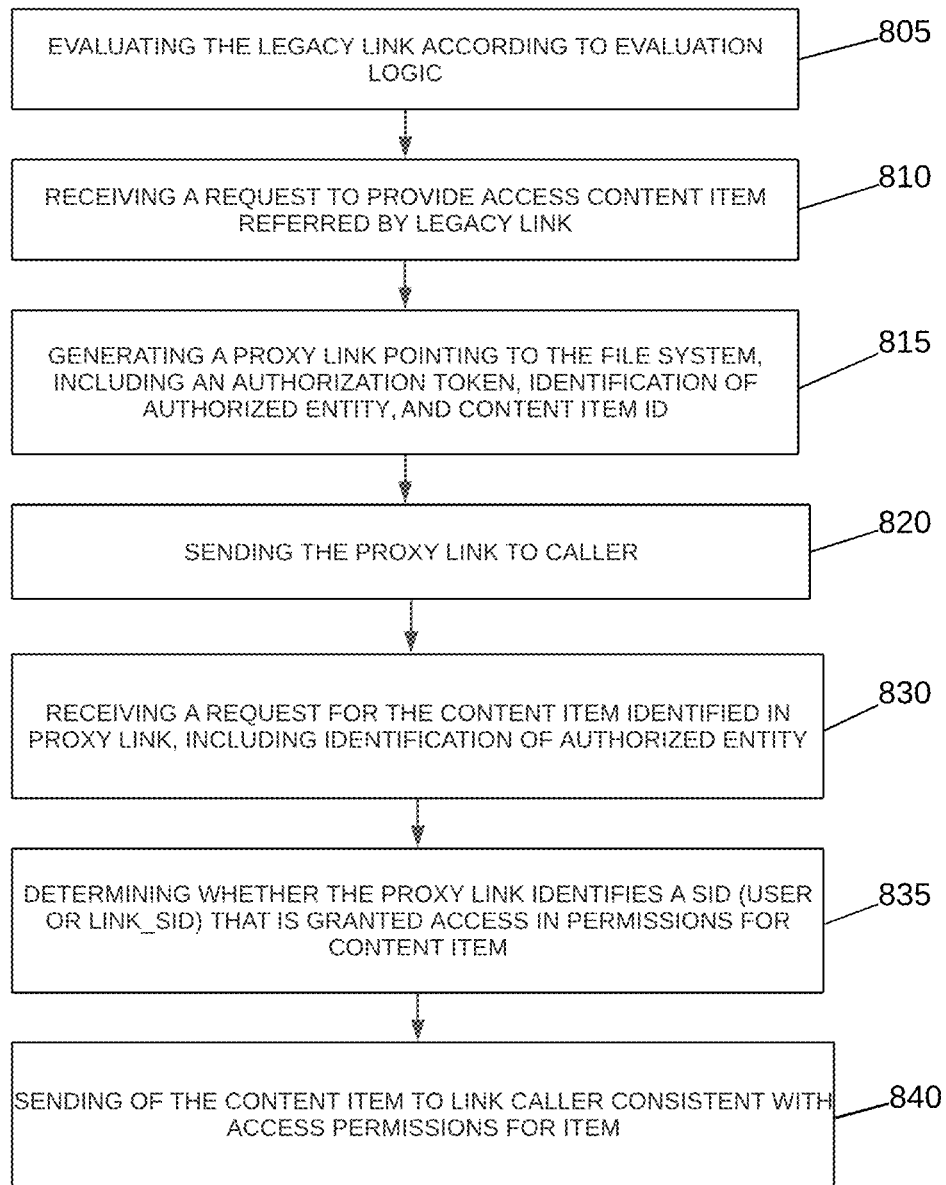
FIG. 14 illustrates an example method for supporting legacy links in accordance with some aspects of the present technology.

FIG. 14 illustrates an example method for supporting legacy links. In some embodiments, links may already exist prior to being given to link service 136 for management. In such embodiments, the link may already direct to a location other than link service 136. Additionally, the link may be associated with a behavior or logic that is different than the behavior or logic provided by link service 136, and it may be undesirable to change the user experience associated with an existing link. At the same time, it may be desirable to have content management system 110 store and manage the object pointed to by the link, or to have link service 136 provide additional link functions. The method illustrated in FIG. 14 is directed to embodiments such as these.

Figure 15A:
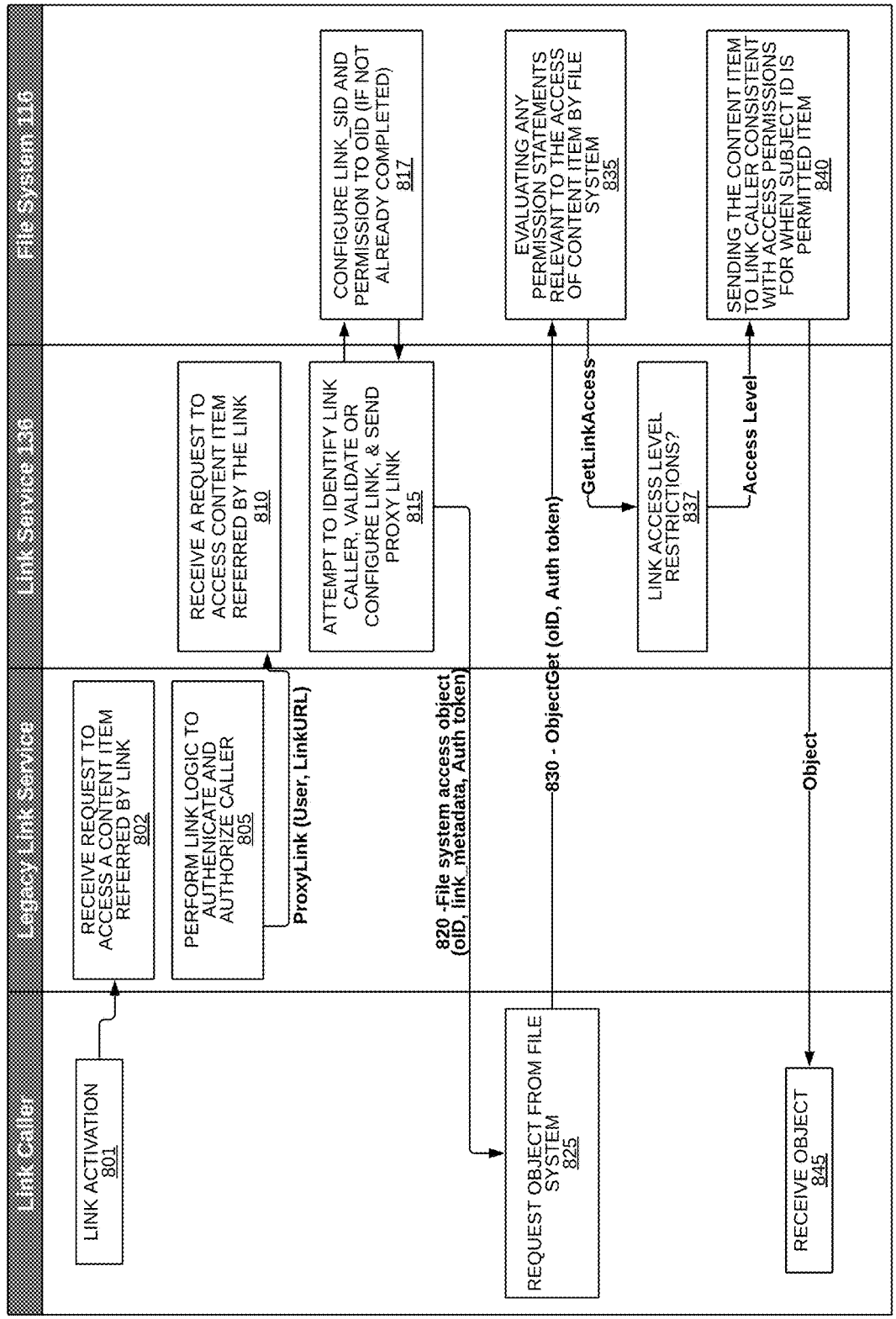
FIG. 15A and FIG. 15B illustrate sequence diagrams illustrating alternate call flows for supporting a legacy link in accordance with some aspects of the present technology.
Figure 15B:
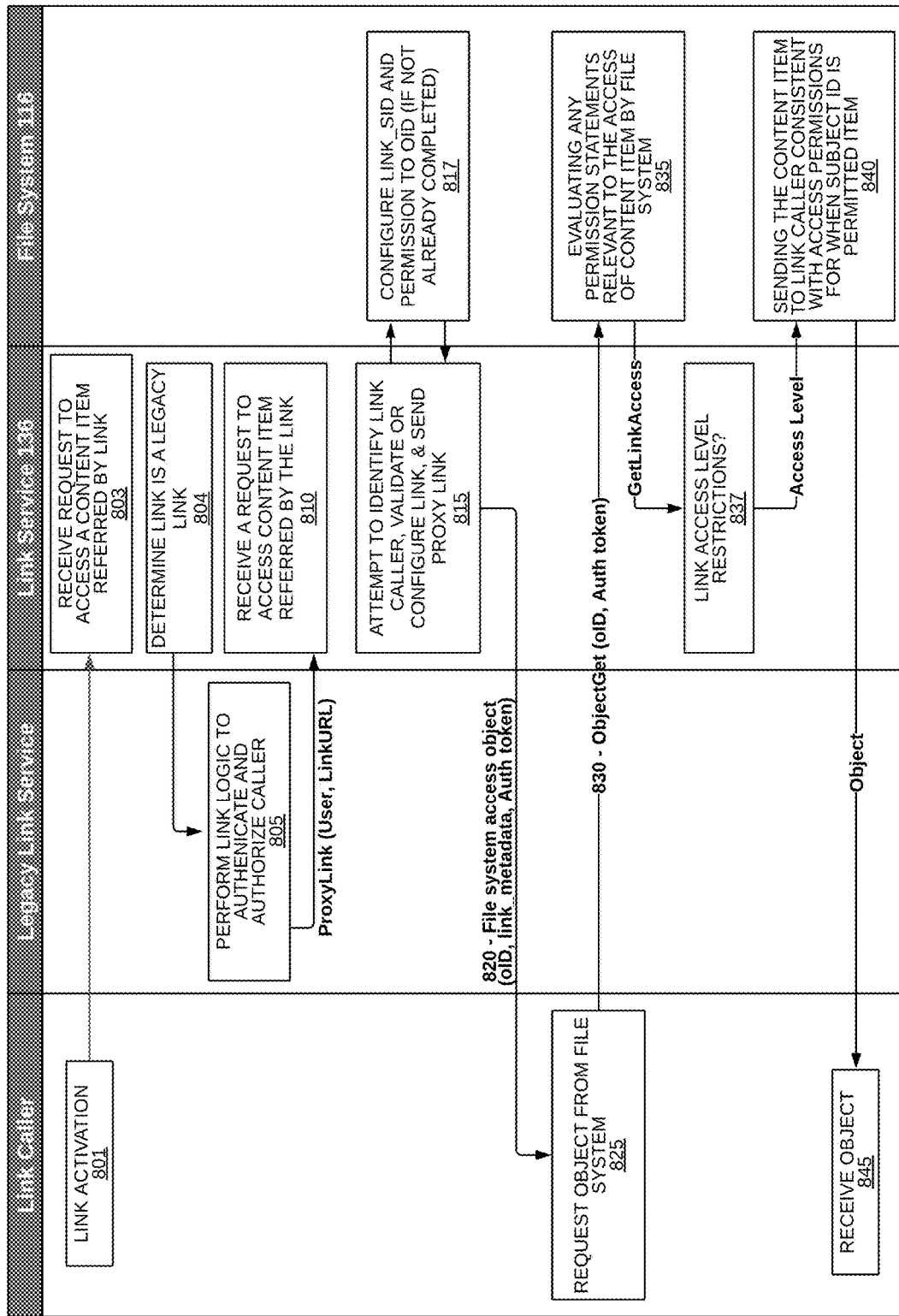

FIG. 15A and FIG. 15B illustrate sequence diagrams illustrating alternate call flows for supporting a legacy link. In particular, FIG. 15A illustrates an example sequence where the link activation directs to an API 138 that calls a function of a link service. This embodiment is useful when an API is updated to point to link service 136 instead of the legacy service. However, FIG. 15B illustrates a sequence for when the legacy link continues to point to the legacy link service, and the legacy link service is updated to refer to link service 136.

A link caller can activate 801 a link. In some embodiments, as illustrated in FIG. 15A the activated link can direct the link caller to the legacy link service which can receive 802 a request for the object. In some embodiments, as illustrated in FIG. 15B, the activated link can direct the link caller to link service 135, which can receive 803 the request to access the object referred to by the link. The link service 136 can determine 804 the link that referred the link caller to link service 136 as a legacy link by looking the link up in link database 510 and forward the request to the legacy link service.

In some embodiments, the method includes evaluating the legacy link according to legacy link evaluation logic at node 805. For example, link service 136 may evaluate the legacy link according to legacy link evaluation logic.

In some embodiments, evaluating the legacy link according to legacy link evaluation logic at node 805 can involve link service 136 interacting with legacy link logic using external link logic interface 530 to interact with link logic from the legacy service as illustrated in FIG. 15B.

In some embodiments, link service 136 can be configured with instructions to evaluate the legacy link logic and will not need to contact the legacy service.

In some embodiments, the legacy link service might determine that the link caller cannot access the object. For example, some legacy link services only permit access when the user that provided access to an object currently maintains access to the object. If the user the that provided access to the object no longer has access to the object, some legacy link services will not allow others, even when accessing with a public link, to access the object.

After the legacy link service has determined that the link caller can access the object, the legacy link service can attempt to identify a proxy link associated with the object referred to by the legacy link, and call the link service 136 using the proxy link.

However, in some embodiments, a proxy link might not exist yet. In some embodiments, when link service 136 is configured to work with a legacy link service, many links may have been previously issued by the legacy link service. It is likely that many of those links will never be activated again. As such, it would be inefficient to proactively create a proxy link for every legacy link. Instead, the present technology can create a proxy link upon request, when needed. In such an embodiment, the legacy link service can attempt to identify a proxy link associated with the object, and if unsuccessful, the legacy link service can request a proxy link from link service 136 (not shown) as an alternative to accessing link service 136 using a known proxy link.

In some embodiments, the method includes receiving a request to provide access to an object referred to by a legacy link at node 810. For example, the link service 136 may receive a request to provide access to an object referred to by a legacy link. The request can be the result of the legacy link service following a proxy link for the object referred to by the legacy link or by making a request for a proxy link to be issued.

If the request 810 was the first request for the legacy link received by link service 136, and the legacy link service is requesting a proxy link, it may be necessary to configure a link_sID in object storage 142, and to configure a proxy link, or link service 136 may already have a proxy link established for the object. If a new proxy link needs to be created, link service 136 can communicate with file system 116 using file system interface 525 to create a proxy link that is associated with a link_sID at file system 116. In some embodiments, the proxy link is associated with its own subject ID (link_sID) in the file system. For example, the method includes generating by the link service, a proxy link pointing to the file system object at node 815, and file system 116 can configure the proxy link and record 817 the link_sID for the proxy link. For example, the link service 136 may generate a proxy link pointing to file system 116.

In some embodiments, when the request 810 was the first request for the legacy link received by link service 136, and the legacy link service is requesting a proxy link, link service 136 might already have a proxy link created to the object that can be reused. For example, link service 136 might have created a proxy link to the object for a different legacy link, and this proxy link can be reused. Proxy links are a bit different from the co-managed link in FIGS. 12A, 12B, and 13, or the link in FIGS. 5, and 6 because those links map to a policy (permission statements) in file system 116 and perhaps at link service 136 too, whereas legacy links have their policy controlled by the legacy link service. As such each proxy link for one or more a legacy links typically has the same policy (permission statements) associated with the link in file system 116. A link_SID of a proxy link, is allowed to read and write to the object according to file system 116. Any additional restrictions from the legacy link service can be imposed by link service 136 at block 837, addressed below.

When the proxy link has already been configured, link service 136 can request the object from file system 116 using the proxy link and providing the Link_sID and any known user sID. The file system can return a file system access object that includes an authorization token, an identification of an authorized entity, and an object ID. In some embodiments, the file system access object includes a token having time-to-live to limit a time in which the file system access object remains valid. The time-to-live can be relatively short to ensure that when the link caller desires to access the object again, they will have to use the legacy link and be subject to the legacy link logic.

In some embodiments, the method includes receiving, by the file system, a request 830 for the object identified in the file system access object. For example, file system 116 may receive a request 830 for the object identified in the file system access object. The file system access object can include an authorization token including an identification of the authorized entity. When the authorization token includes 835 a subject ID (sID and/or link_sID) that is granted access in the access permissions for the object at node 835, file system 116 can send the object, and the link caller consistent with the access permissions for the object at node 840. In some embodiments, prior to sending 840 the object to the link caller, file system 116 can interact with link service 136 to determine 837 whether any other link access restrictions might be in place—for example, such as access restrictions dictated by the legacy link service.

The link caller can receive 845 the object.

Figure 16:
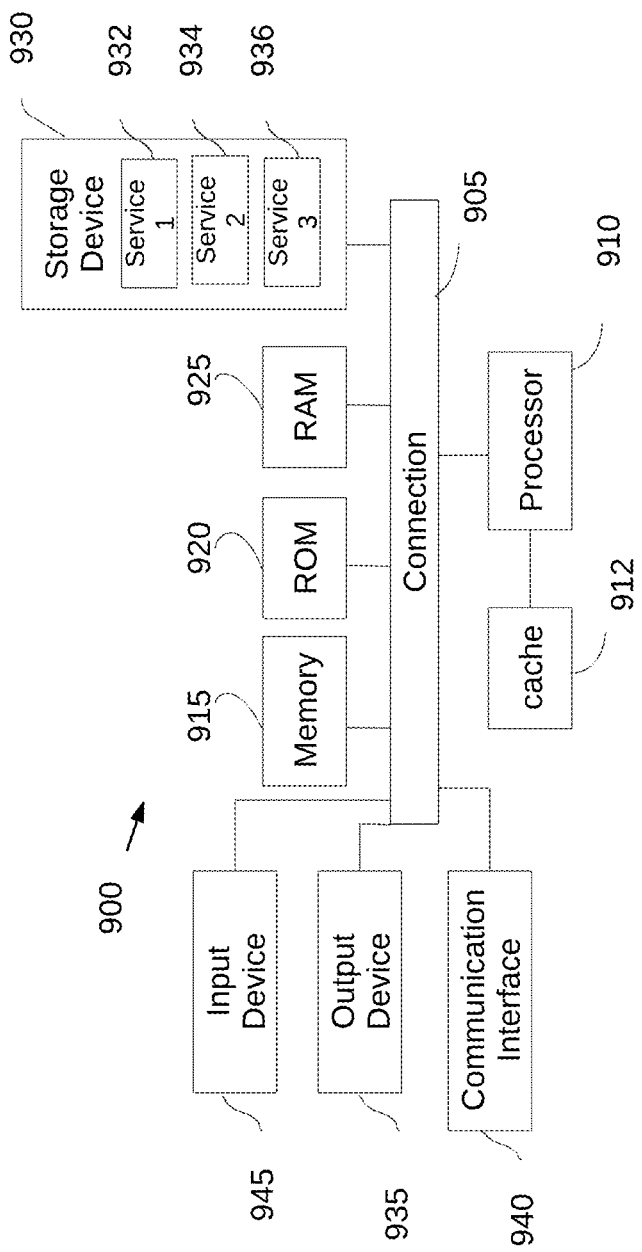
FIG. 16 shows an example of a system for implementing some aspects of the present technology.

FIG. 16 shows an example of computing system 900, which can be for example any computing device making up link service 136, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
receiving, by a link service, a request to provide a link caller access to an object referred to by a legacy link created by a legacy link service, wherein the request is a result of a proxy link called by the legacy link service;
validating, by the link service, the proxy link and performing, by the link service, at least one link servicing function; and
sending, by the link service, a file system access object pointing to a file system to the link caller of the legacy link, the file system access object including an authorization token, an identification of an authorized entity, and an object ID, wherein the file system access object is effective to retrieve the object from the file system.

2. The method of claim 1, further comprising:
evaluating, by the link service, the legacy link according to legacy link evaluation logic, wherein the evaluating comprises:
receiving, by the link service, an access level from the legacy link service,
wherein the access level corresponds to the access of the link caller to the object; and
sending, by the link service, the access level to the file system.

3. The method of claim 2, wherein the evaluating the legacy link according to the legacy link evaluation logic further comprises:
determining, by the link service, that the link caller is not authorized to access the object when a user account that originated the legacy link no longer has access to the object.

4. The method of claim 1, further comprising:
when the proxy link has not been created, receiving, by the link service, a different request to access the object from the legacy link service that does not identify the proxy link; and
communicating, by the link service, with the file system to create a new proxy link, wherein the new proxy link is associated with its own user ID in the file system, and wherein the new proxy link is a proxy for the legacy link.

5. The method of claim 4, wherein the file system access object does not include the new proxy link.

6. The method of claim 1, wherein the file system access object includes the authorization token having a time-to-live to limit a time in which the file system access object remains valid.

7. The method of claim 1, further comprising:
determining, by the file system, whether the file system access object identifies a sID that is granted access by access permissions in the file system for the object; and
when the sID is granted access to the object, performing, by the file system, the sending of the object to the link caller consistent with the access permissions for the object.

8. A non-transitory computer readable medium comprising instructions, the instructions, when executed by a computing system comprising a legacy link service and a link service, cause the computing system to:
receive, by the link service and via the legacy link service, a first request from a link caller to provide access to an object referred to by a legacy link;
evaluate, by the link service, the legacy link according to legacy link evaluation logic provided by the legacy link service;
after the legacy link has been evaluated according to the legacy link evaluation logic, receive, by the link service, a second request to provide the access to the object referred to by the legacy link, wherein the second request is a result of a proxy link called by the legacy link service;
validate, by the link service, the proxy link and perform, by the link service, at least one link servicing function; and
cause, by the link service, a file system to configure a sID and send, by the link service, a file system access object pointing to the file system to the link caller of the legacy link, the file system access object including an authorization token, an identification of an authorized entity, and an object ID, wherein the file system access object is effective to retrieve the object from the file system, and wherein the authorization token, the identification of the authorized entity, and the object ID are used to identify, by the file system, whether the proxy link identifies the sID that is granted access in permissions for the object.

9. The computer readable medium of claim 8, wherein the computer readable medium further comprises instructions that, when executed by the computing system, cause the computing system to:
 receive, by the link service, an access level from the legacy link service wherein the access level corresponds to the access of the link caller to the object; and
 send, by the link service, the access level to the file system.

10. The computer readable medium of claim 8, wherein the computer readable medium further comprises instructions that, when executed by the computing system, cause the computing system to:
 determine, by the link service, that the link caller is not authorized to access the object when a user account that originated the legacy link no longer has access to the object.

11. The computer readable medium of claim 8, wherein the computer readable medium further comprises instructions that, when executed by the computing system, cause the computing system to:
 when the proxy link has not been created, receive, by the link service, a different request to access the object from the legacy link service that does not identify the proxy link; and
 communicate, by the link service, with the file system to create a new proxy link, wherein the new proxy link is associated with its own user ID in the file system, and wherein the new proxy link is a proxy for the legacy link.

12. The computer readable medium of claim 11, wherein the file system access object does not include the new proxy link.

13. The computer readable medium of claim 8, wherein the file system access object includes a token having a time-to-live to limit a time in which the file system access object remains valid.

14. The computer readable medium of claim 8, wherein the computer readable medium further comprises instructions that, when executed by the computing system, cause the computing system to:
 determine, by the file system, whether the proxy link identifies a sID that is granted access by access permissions in the file system for the object; and
 when the sID is granted access to the object, send, by the file system, the object to the link caller consistent with the access permissions for the object.

15. A link service in communication with a legacy link service for supporting legacy links, comprising:
 a storage configured to store instructions; and
 a processor configured to execute the instructions and cause the link service to:
  receive a request to provide a link caller access to an object referred to by a legacy link created by the legacy link service, wherein the request is a result of a proxy link called by the legacy link service;
  validate the proxy link and perform at least one link servicing function; and
  send a file system access object pointing to a file system to the link caller of the legacy link, the file system access object including an authorization token, an identification of an authorized entity, and an object ID, wherein the file system access object is effective to retrieve the object from the file system.

16. The link service of claim 15, wherein the processor is configured to execute the instructions and further cause the link service to:
 evaluate the legacy link according to legacy link evaluation logic, wherein to evaluate the legacy link, execution of the instructions further causes the link service to:
  receive an access level from the legacy link service, wherein the access level corresponds to the access of the link caller to the object; and
  send the access level to the file system.

17. The link service of claim 15, wherein the processor is configured to execute the instructions and further cause the link service to:
 determine that the link caller is not authorized to access the object when a user account that originated the legacy link no longer has access to the object.

18. The link service of claim 15, wherein the processor is configured to execute the instructions and further cause the link service to:
 when the proxy link has not been created, receive a different request to access the object from the legacy link service that does not identify the proxy link; and
 communicate with the file system to create a new proxy link, wherein the new proxy link is associated with its own user ID in the file system, wherein the new proxy link is a proxy for the legacy link.

19. The link service of claim 15, wherein multiple legacy links map to one proxy link for the object.

20. The link service of claim 16, wherein:
 based on the access level from the link service, the file system determines whether the proxy link identifies a sID that is granted access by access permissions in the file system for the object; and
 when the sID is granted access to the object, the file system sends the object to the link caller consistent with the access permissions for the object.

* * * * *